US010642716B1

(12) United States Patent
Yoshida et al.

(10) Patent No.: US 10,642,716 B1
(45) Date of Patent: May 5, 2020

(54) AUTOMATED SOFTWARE PROGRAM REPAIR

(71) Applicant: FUJITSU LIMITED, Kawasaki-shi, Kanagawa (JP)

(72) Inventors: Hiroaki Yoshida, Cupertino, CA (US); Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/270,509

(22) Filed: Feb. 7, 2019

(51) Int. Cl.
*G06F 9/44* (2018.01)
*G06F 11/36* (2006.01)

(52) U.S. Cl.
CPC ...... *G06F 11/3624* (2013.01); *G06F 11/3612* (2013.01); *G06F 11/3664* (2013.01)

(58) Field of Classification Search
CPC .................................................. G06F 11/3624
USPC ......................................................... 717/131
See application file for complete search history.

(56) References Cited

U.S. PATENT DOCUMENTS

| | | | | |
|---|---|---|---|---|
| 5,758,062 A * | 5/1998 | McMahon | .......... | G06F 11/3688 714/33 |
| 5,864,785 A * | 1/1999 | Manthey | ............ | G05B 19/0428 702/116 |
| 5,864,875 A * | 1/1999 | Van Huben | ............. | G06F 17/50 |
| 6,708,291 B1 * | 3/2004 | Kidder | ................ | G06F 11/0709 714/26 |
| 7,379,846 B1 * | 5/2008 | Williams | .............. | G06F 11/079 702/183 |
| 7,490,319 B2 * | 2/2009 | Blackwell | ........... | G06F 11/3664 717/124 |
| 8,589,914 B2 * | 11/2013 | Wookey | .................. | G06F 8/658 717/175 |
| 2007/0240154 A1 * | 10/2007 | Gerzymisch | .............. | G06F 8/61 717/174 |

OTHER PUBLICATIONS

P. Avgustinov et al., "Tracking Static Analysis Violations over Time to Capture Developer Characteristics," ICSE Jun. 2015.
K. Liu et al., "Mining Fix Patterns for FindBugs Violations," arXiv:1712.03201 [cs.SE], Dec. 2017.
E. G. Knyazev, "Automated Source Code Changes Classification for Effective Code Review and Analysis," Second Spring Young Researchers' Colloquium on Software Engineering, 2008.
A. Zeller, "Yesterday, my program worked. Today it does not. Why?," FSE Mar. 11, 1999.

(Continued)

*Primary Examiner* — Evral E Bodden
(74) *Attorney, Agent, or Firm* — Maschoff Brennan

(57) ABSTRACT

According to an aspect of an embodiment, operations may include determining a plurality of event correspondences. Each event correspondence may indicate a correspondence between a respective change of a plurality of changes made to first source code of a first software program and a respective event type that occurs with respect to the first software program. The plurality of event correspondences may be determined by performing two or more event type inference operations of a plurality of event type inference operations. The plurality of event type inference operations may include determining a fault introduction event, determining a fault correction event, determining a defect introduction event, determining a defect correction event, and determining a platform migration event.

20 Claims, 14 Drawing Sheets

(56) References Cited

OTHER PUBLICATIONS

G. Misherghi, Z. Su, "HDD: Hierarchical Delta Debugging," ICSE May 28, 2006.
B. Fluri et al., "Change Distilling: Tree Differencing for Fine-Grained Source Code Change Extraction," IEEE TSE Nov. 1, 2007.
D. Kawrykow and M. P. Robillard, "Non-Essential Changes in Version Histories," ICSE May 21, 2011.

\* cited by examiner

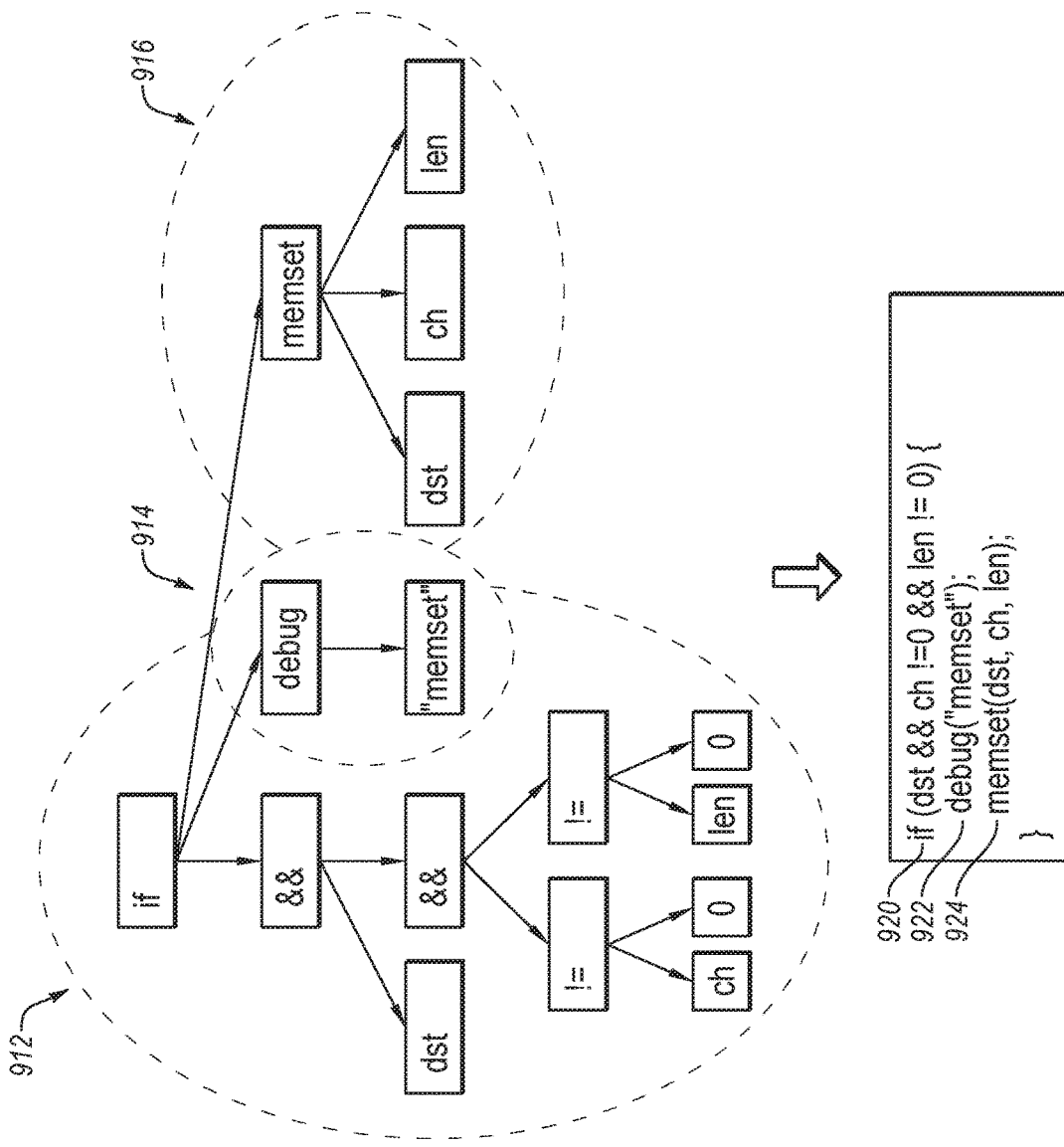
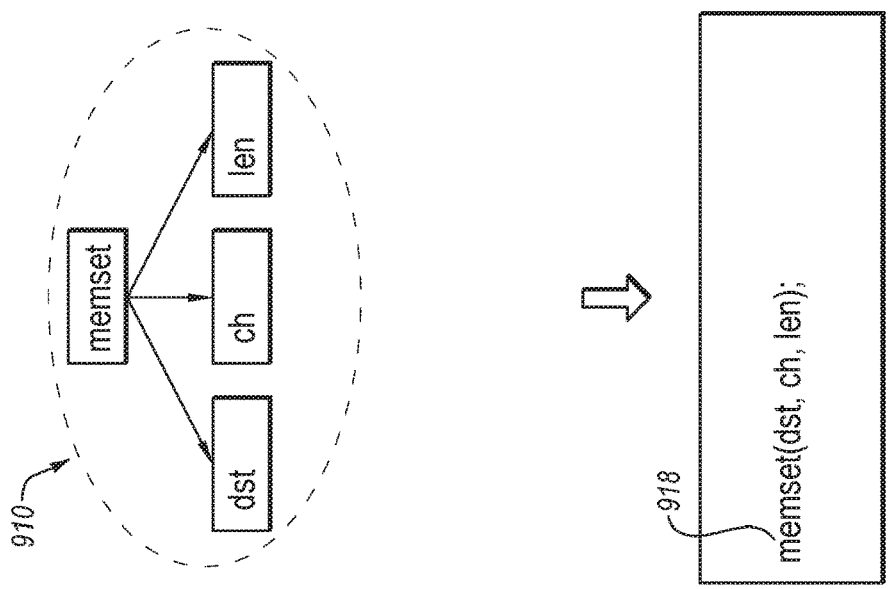
FIG. 9C

US 10,642,716 B1

AUTOMATED SOFTWARE PROGRAM REPAIR

FIELD

The embodiments discussed in the present disclosure are related to automated software program repair.

BACKGROUND

Software programs often have errors in them (commonly referred to as "bugs") in which they may not operate as intended. Often automated repair systems are used in attempt to identify and correct errors in software programs.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, operations may include determining a plurality of event correspondences. Each event correspondence may indicate a correspondence between a respective change of a plurality of changes made to first source code of a first software program and a respective event type that occurs with respect to the first software program. The plurality of event correspondences may be determined by performing two or more event type inference operations of a plurality of event type inference operations. The plurality of event type inference operations may include determining that a fault introduction event corresponds to a first change of the plurality of changes based on identifying a first software test of the first source code that passed without the first change included in the first source code and that failed with the first change included in the first source code. The plurality of event type inference operations may also include determining that a fault correction event corresponds to a second change of the plurality of changes based on identifying a second software test of the first source code that failed without the second change included in the first source code and that passed with the second change included in the first source code. In addition, the plurality of event type inference operations may include determining that a defect introduction event corresponds to a third change of the plurality of changes based on a first defect not being identified from a first static analysis performed on the first source code without the third change being included in the first source code and based on the first defect being identified from a second static analysis performed on the first source code with the third change included in the first source code. Moreover, the plurality of event type inference operations may include determining that a defect correction event corresponds to a fourth change of the plurality of changes based on a second defect that is identified from a third static analysis performed on the first source code with the fourth change included in the first source code and based on the second defect not being identified from a fourth static analysis performed on the first source code with the fourth change included in the first source code. The plurality of event type inference operations may also include determining that a platform migration event from a first version of a particular platform to a second version of the particular platform corresponds to a fifth change of the plurality of changes based on a first build of the first source code with the fifth change included therein having an error that is omitted with respect to a second build of the first source code with the fifth change included therein, the first build being performed using the first version of the particular platform and the second build being performed using the second version of the particular platform.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 9C illustrates example textual representations of the sub-trees of FIG. 9B;

DESCRIPTION OF EMBODIMENTS

Figure 1:
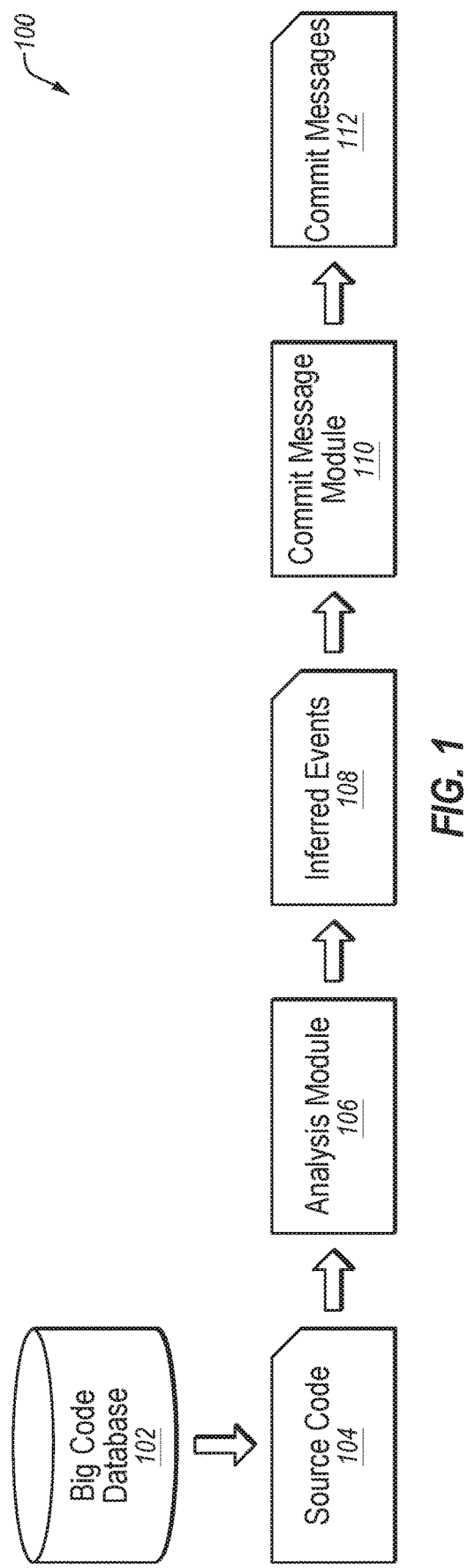
FIG. 1 is a diagram representing an example environment related to inferring events that occur with respect to a software program.

Some embodiments described in the present disclosure relate to methods and systems of repairing software programs. Software programs often include errors (also commonly referred to as "bugs") that may cause the software programs to behave in an unintended manner. Additionally, automated repair systems and techniques are often used to detect and correct errors to repair software programs.

Additionally, repositories of existing software programs may be used to identify patterns in the corresponding code that may be used to identify and/or correct errors in code that is being developed or tested. In some instances, the repositories of existing software programs may include source code of a large number of software programs (e.g., thousands, tens of thousands, hundreds of thousands, millions, etc. of software programs). In addition, the repositories may include different iterations of the source code of the respective software programs that are made through one or more changes made to the source code. In the present disclosure, existing software programs and the corresponding source code that are stored in such repositories and that may be used to help develop other software programs may be referred to as "big code." In some instances, the changes made between the different iterations of source code of a particular software program may be to correct errors and/or may introduce errors. Additionally or alternatively, the changes may be due to a platform migration, added behavior, removed behavior, refactoring of the source code, etc. Understanding events that cause a change in source code or that are caused by changes in source code may help in the development of other software by helping identify when and where changes may be needed and/or problematic.

In some instances, one or more changes in the source code may have a corresponding message (referred to as a "commit message") generated to provide some insight as why the corresponding change was made (e.g., to provide insight regarding an event that caused or was caused by the corresponding change). However, commit messages that are included with existing source code are often overly vague and/or broad to provide meaningful insight. Further, the events that correspond to a respective change are also commonly not readily apparent. As such, the events that correspond to changes in the repositories of existing software programs are an untapped resource that may be very helpful in improving software programs that are in development or being tested but that are not readily available.

According to one or more embodiments of the present disclosure, the technological field of software development may be improved by configuring a computing system in a manner in which the computing system is able to infer events that correspond to changes made between different versions of existing software programs. Additionally, in some embodiments, the computing system may be configured to generate, based on the inferred events, commit messages that are more detailed and explanatory than those typically included in commit libraries associated with software programs.

In these or other embodiments, the computing system may be configured to use the inferred events and/or improved commit messages with respect to testing and/or developing other software programs. For example, the computing system may be configured to compare events that have occurred with respect to code-under-test of a software program against events inferred from big code to identify potential errors that may have been introduced or fixed in the code under test. Additionally or alternatively, the computing system may be configured to identify, in the big code, code patterns associated with the inferred events. In these or other embodiments, the identified code patterns may be used to select or implement repairs (e.g., to select or implement repairs with similar code patterns) with respect to the code under test in response to the inferred events associated with the identified code patterns being the same or similar to events associated with the code under test. For example, U.S. patent application Ser. No. 15/822,106 filed on Nov. 24, 2017 and U.S. patent application Ser. No. 15/915,894 filed on Mar. 8, 2018, which are both incorporated by reference herein in their entireties, discuss the use of code patterns in existing source code to implement repairs in other source code.

Additionally or alternatively, changes in the source code may at times include one or more secondary modifications that do not affect the underlying functionality of the corresponding software program. The inclusion of the secondary modifications in existing source code (e.g., big code) that may be used to help in the development of other source code may make it difficult to identify which portions of the existing source code may be helpful or unhelpful in the development or testing of the other source code.

According to one or more embodiments of the present disclosure, operations may be performed to identify secondary modifications in source code and to remove the identified secondary modifications. The removal of the secondary modifications may help facilitate the identification of code patterns in existing source code that may be useful for the development and testing of other source code. In these or other embodiments, the inference of events may be used to help identify secondary modifications, as detailed below. In the present disclosure, reference to "secondary" modifications may refer to modifications that may not change the underlying functionality of the corresponding source code. For example, "secondary" modifications be include for cosmetic modifications (e.g., to improve readability) or modifications that may be used for debugging purposes.

Additionally or alternatively, the removal of secondary modifications may help identify which modifications may include an error. For example, particular source code may have a particular change made to it that may introduce one or more errors in the particular source code. The change may include multiple modifications that were made to the particular source code in which one or more of the multiple modifications may be secondary modifications whose inclusion may not have contributed to the error. The removal of secondary modifications may thus help identify which modifications of the change contributed to the error. The improved identification of the error may thus facilitate the correction of the error and consequently may help improve the particular source code.

Embodiments of the present disclosure are explained with reference to the accompanying drawings.

FIG. 1 is a diagram representing an example environment 100 related to inferring events that occur with respect to a software program, arranged in accordance with at least one embodiment described in the present disclosure. The environment 100 may include an analysis module 106 configured to analyze source code 104 of the software program to determine one or more inferred events 108 that occurred with respect to the software program and that are associated with one or more changes made to the source code 104. In these or other embodiments, the environment 100 may include a commit message module 110 configured to obtain the inferred events 108 and to generate corresponding commit messages 112. Each commit message 112 may include an indication of a respective inferred event 108 that may be a reason or cause for a respective change or that may have been the result of the respective change.

The source code 104 may include electronic data, such as, for example, the software program, code of the software program, libraries, applications, scripts, or other logic or instructions for execution by a processing device. In some embodiments, the source code 104 may include a complete instance of the software program. Additionally or alternatively, the source code 104 may include a portion of the software program. The source code 104 may be written in any suitable type of computer language that may be used for the software program.

In some embodiments, the source code 104 may include multiple iterations of the code of the software program. For example, multiple changes may be made to the source code 104 as updates, patches, platform migrations, bug fixes, cosmetic rearrangement, etc. The multiple changes may thus result in two or more different iterations of the source code 104. In these or other embodiments, the source code 104 may include two or more of such iterations of the code of the software program in which one or more differences may exist between the different iterations due to changes made between the iterations. Additionally, reference to a "change" to source code in the present disclosure may include any number of modifications that may be made to one or more lines of code. For example, a change may range from something as simple as a single element name change, element addition, or element deletion in a single line of code to something as complex as introducing or deleting a large number of lines of code.

The analysis module 106 may include code and routines configured to enable a computing device to perform one or more operations with respect to the source code 104 to obtain the inferred events 108. Additionally or alternatively, the analysis module 106 may be implemented using hardware including a processor, a microprocessor (e.g., to perform or control performance of one or more operations), a field-programmable gate array (FPGA), or an application-specific integrated circuit (ASIC). In some other instances, the analysis module 106 may be implemented using a combination of hardware and software. In the present disclosure, operations described as being performed by the analysis module 106 may include operations that the analysis module 106 may direct a corresponding system to perform.

The analysis module 106 may be configured to obtain the source code 104 including multiple iterations of the source code 104. In some embodiments, the analysis module 106 may be configured to obtain the source code 104 from a big code database 102. The big code database 102 may be a repository of existing software programs and their respective source code. In these or other embodiments, the big code database 102 may include different iterations of the corresponding source code. Additionally or alternatively, the big code database 102 may be made available for analysis, which may help facilitate the development and debugging of other software programs.

The analysis module 106 may be configured to perform a series of operations with respect to the source code 104 that may be used to determine event correspondences with respect to the source code 104. In some embodiments, each event correspondence may indicate a correspondence between a respective change made to the source code 104 and a respective event type that occurs with respect to the software program. In these or other embodiments, the analysis module 106 may be configured to output the inferred events 108.

As indicated above, the inferred events 108 may include events that occurred with respect to the software program and that were caused by or the cause of changes made to the source code 104 between different iterations of the source code 104. By way of example, the inferred events 108 may include error correction, error introduction, a platform migration, added behavior, removed behavior, refactoring of the source code 104, etc.

In some embodiments, the analysis module 106 may be configured to perform event type inference operations with respect to changes made to the source code 104 to determine event types that correspond to respective changes. In these or other embodiments, the analysis module 106 may be configured to output the inferred events 108 as indications as to which event types correspond to which changes. For example, the inferred events 108 may include a particular change, a location of the particular change in the source code 104, a particular event that has been determined as corresponding to the particular change, and an indication of the correspondence between the particular event and the particular change. In some embodiments, event type inference operations that may be performed by the analysis module 106 to determine the inferred events 108 may include one or more operations described below with respect to the methods 500, 600, 700, 800, 900, 1000, and 1100 of FIGS. 5-11, respectively, discussed in detail below.

In some embodiments, the environment 100 may include the commit message module 110. The commit message module 110 may include code and routines configured to enable a computing device to perform one or more operations with respect to the inferred events 108 to obtain the commit messages 112. Additionally or alternatively, the commit message module 110 may be implemented using hardware including a processor, a microprocessor (e.g., to perform or control performance of one or more operations), a field-programmable gate array (FPGA), or an application-specific integrated circuit (ASIC). In some other instances, the commit message module 110 may be implemented using a combination of hardware and software. In the present disclosure, operations described as being performed by the commit message module 110 may include operations that the commit message module 110 may direct a corresponding system to perform.

The commit message module 110 may be configured to generate the commit messages 112 such that the commit messages 112 provide more insight regarding reasons why particular code changes were made or the effects of particular code changes. For example, the commit message module 110 may be configured to generate the commit messages 112 using the inferred events 108 such that the commit messages 112 provide a message that describes a particular change, a particular event that corresponds to the change, and the correspondence of the particular event to the particular change.

For instance, the particular event may be indicated in the inferred events 108 as an error correction event of a particular type of error. Additionally, the particular change may be indicated in the inferred events 108 by the modifications that were made to correct the error and the location in the source code 104 of the modifications. In these or other embodiments, the commit message module 110 may be configured to generate a particular commit message that states that the particular type of error was corrected by the particular change. In some embodiments, the commit message module 110 may be configured to include the particular commit message in the source code at the location of the particular change. Additionally or alternatively, the commit message module 110 may be configured to include the particular commit message in an event report in which the particular commit message of the event report may indicate the location of the particular change.

Modifications, additions, or omissions may be made to FIG. 1 without departing from the scope of the present disclosure. For example, the environment 100 may include more or fewer elements than those illustrated and described in the present disclosure. For instance, in some embodiments, the environment 100 may include the analysis module 106 but not the commit message module 110 and in other embodiments the environment 100 may include the commit message module 110 but not the analysis module 106. In addition, in some embodiments, one or more routines, one or more instructions, or at least a portion of code of the analysis module 106 and the commit message module 110 may be combined such that they may be considered the same element or may have common sections that may be considered part of the analysis module 106 and the commit message module 110.

Figure 2:
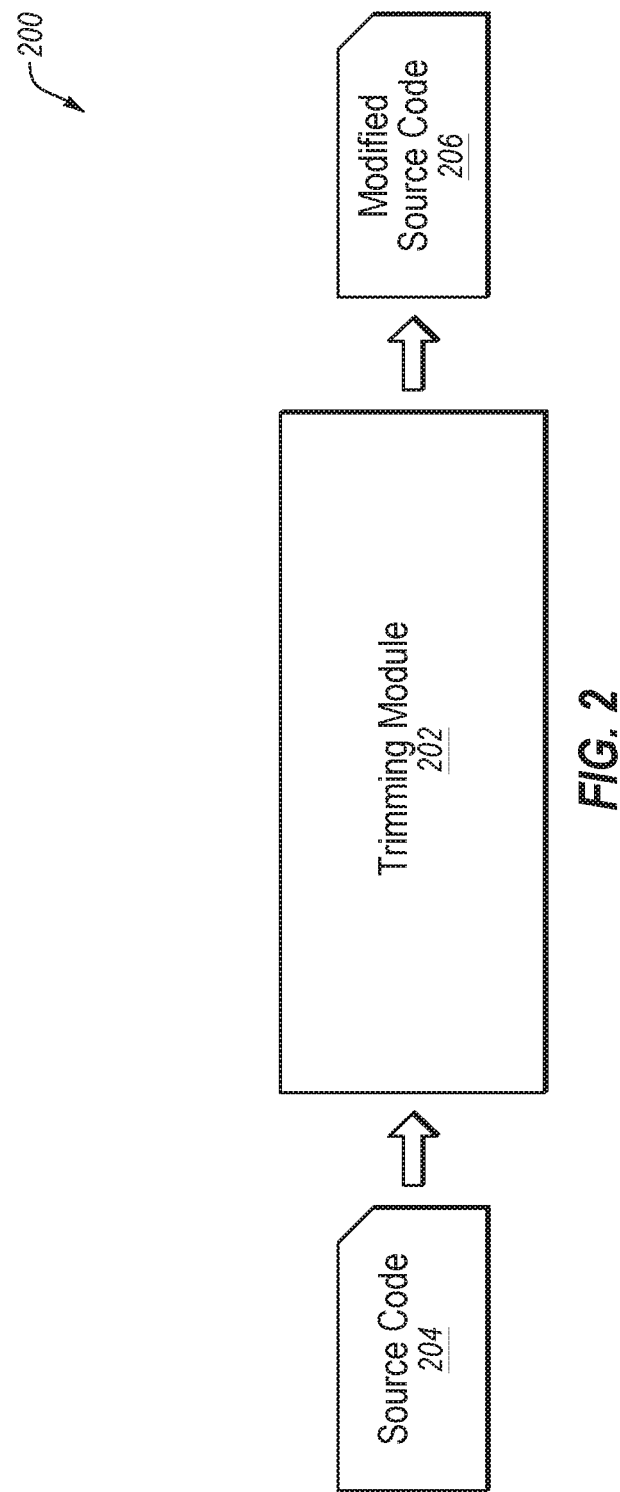
FIG. 2 is a diagram representing an example environment related to removing secondary modifications from a software program.

FIG. 2 is a diagram representing an example environment 200 related to removing secondary modifications from a software program, arranged in accordance with at least one embodiment described in the present disclosure. The environment 200 may include a trimming module 202 configured to analyze source code 204 of the software program to remove one or more secondary modifications made to the source code 204 to obtain modified source code 206.

The source code 204 may include electronic data, such as, for example, the software program, code of the software program, libraries, applications, scripts, or other logic or instructions for execution by a processing device. In some embodiments, the source code 204 may include a complete instance of the software program. Additionally or alternatively, the source code 204 may include a portion of the software program. The source code 204 may be written in any suitable type of computer language that may be used for the software program.

In some embodiments, the source code 204 may include multiple iterations of the code of the software program. For example, multiple changes may be made to the source code 204 as updates, patches, platform migrations, bug fixes, cosmetic rearrangement, etc. The multiple changes may thus result in two or more different iterations of the source code 204. In these or other embodiments, the source code 204 may include two or more of such iterations of the code of the software program in which one or more differences may exist between the different iterations due to changes made between the iterations.

Additionally or alternatively, in some embodiments, the source code 204 may include software code that is under development or being tested. In these or other embodiments, the source code 204 may include two or more iterations of the code that is under development or being tested.

The trimming module 202 may include code and routines configured to enable a computing device to perform one or more operations with respect to the source code 204 to obtain the modified source code 206. Additionally or alternatively, the trimming module 202 may be implemented using hardware including a processor, a microprocessor (e.g., to perform or control performance of one or more operations), a field-programmable gate array (FPGA), or an application-specific integrated circuit (ASIC). In some other instances, the trimming module 202 may be implemented using a combination of hardware and software. In the present disclosure, operations described as being performed by the trimming module 202 may include operations that the trimming module 202 may direct a corresponding system to perform.

The trimming module 202 may be configured to obtain the source code 204 including multiple iterations of the source code 204. In some embodiments, the trimming module 202 may be configured to obtain the source code 204 from a big code database, such as the big code database 102 of FIG. 1.

The trimming module 202 may be configured to perform a series of operations with respect to different iterations of the source code 204 to determine which modifications made between the iterations are primary modifications and secondary modifications. As indicated above, reference to "secondary" modifications may refer to modifications that may not change the underlying functionality of the source code 204. Conversely, reference to "primary" modifications may refer to modifications that may change the underlying functionality of the source code 204.

In these or other embodiments, the trimming module 202 may be configured to remove from the source code 204 those modifications that are determined to be secondary modifications. The modified source code 206 that may be output by the trimming module may include the source code 204 with the determined secondary modifications removed. In some embodiments, the trimming module 202 may be configured to generate the modified source code 206 using one or more operations described below with respect to the methods 500, 600, and 700 of FIGS. 5-7, respectively, discussed in detail below.

Modifications, additions, or omissions may be made to FIG. 2 without departing from the scope of the present disclosure. For example, the environment 200 may include more or fewer elements than those illustrated and described in the present disclosure. For instance, in some embodiments, the environment 200 may be included with the environment 100 of FIG. 1. In addition, in some embodiments, one or more routines, one or more instructions, or at least a portion of code of the trimming module 202 may be combined with one or more of the analysis module 106 and the commit message module 110.

Figure 3:
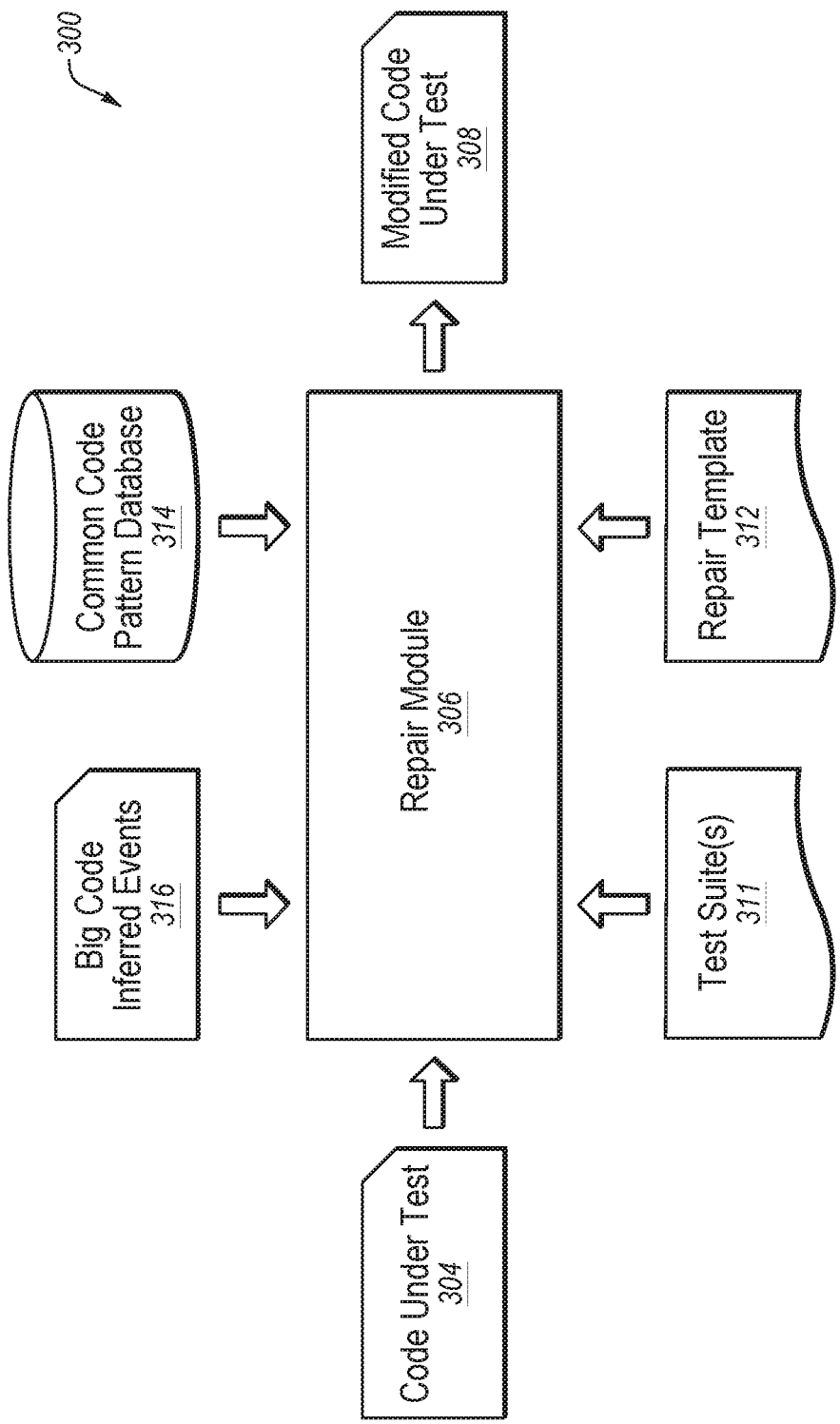
FIG. 3 is a diagram representing an example environment related to repairing a software program.

FIG. 3 is a diagram representing an example environment 300 related to repairing a software program, arranged in accordance with at least one embodiment described in the present disclosure. The environment 300 may include a repair module 306 configured to analyze code under test 304 for errors. The repair module 306 may also be configured to output modified code under test 308, which may include one or more modifications made to the code under test 304 by repair operations performed by the repair module 306.

The code under test 304 may include electronic data, such as, for example, the software program, source code of the software program, libraries, applications, scripts, or other logic or instructions for execution by a processing device. In some embodiments, the code under test 304 may include a complete instance of the software program. Additionally or alternatively, the code under test 304 may include a portion of the software program. The code under test 304 may be written in any suitable type of computer language that may be used for the software program. In some embodiments, the code under test 304 may include one or more iterations of the source code of the software program. Additionally or alternatively, the code under test 304 may include the source code 104 or the source code 204 of FIGS. 1 and 2, respectively.

The repair module 306 may include code and routines configured to enable a computing device to perform one or more modifications of the code under test 304 to generate the modified code under test 308. Additionally or alternatively, the repair module 306 may be implemented using hardware including a processor, a microprocessor (e.g., to perform or control performance of one or more operations), a field-programmable gate array (FPGA), or an application-specific integrated circuit (ASIC). In some other instances, the repair module 306 may be implemented using a combination of hardware and software. In the present disclosure, operations described as being performed by the repair module 306 may include operations that the repair module 306 may direct a corresponding system to perform.

The repair module 306 may be configured to perform a series of repair operations with respect to the code under test 304 that may be used to repair (also referred to as correct) one or more errors in the code under test 304. In some embodiments, the repair module 306 may be configured to perform one or more of the repair operations based on a repair template 312 and one or more test suites 311.

The repair template 312 may include any suitable type of instructions or routines that, when executed, may be configured to implement one or more modifications with respect to the code under test 304 in response to the presence of errors in the code under test 304. The modifications may include changes in the code under test 304 that may repair or attempt to repair the errors. In the present disclosure, the modifications that may be performed may be referred to as "repair candidates" or "repairs."

The test suites 311 may include one or more routines that may act as test cases for the code under test 304. The test suites 311 may be configured to determine whether the code under test 304 behaves in a specified manner. The test suites 311 may be configured according to any suitable technique.

The repair module 306 may be configured to apply one or more of the test suites 311 with respect to the code under test 304 to detect or determine one or more errors and corresponding error locations in the code under test 304. In some embodiments, the repair module 306 may be configured to execute one or more tests included in the test suites 311, which may be referred to as performing a test execution. A test execution that passes may be referred to as a "passing test execution" and a test execution that fails may be referred to as a "failing test execution." In some embodiments, an error location and corresponding error of the code under test 304 may be identified based on a failing test execution executing code appearing at the error location.

In some embodiments, the repair module 306 may include a trimming module such as the trimming module 202 described with respect to FIG. 2. In these embodiments, the repair module 306 may be configured to more accurately identify error locations using the trimming module. For example, the repair module 306 may be configured to identify that a particular error location includes a particular error that was introduced after a particular change was implemented. In some embodiments, the repair module 306 may include an analysis module such as the analysis module 106 of FIG. 1 to identify that the particular error was introduced by the particular change. Additionally or alternatively, the repair module 306 may identify that the particular change caused the particular error using any other suitable technique such as a bisection technique.

Using the trimming module, the repair module 306 may be configured to identify which modifications of the particular change may be secondary modifications. Additionally or alternatively, using the trimming module, the repair module 306 may be configured to remove the secondary modifications to identify primary modifications of the particular change that resulted in the particular error. In some embodiments, the repair module 306 may be configured to pinpoint such primary modifications as described in detail below with respect to method 800 of FIG. 8.

In some embodiments, the repair module 306 may be configured to obtain a repair candidate from the repair template as a potential modification that may be made to repair a detected error. In some embodiments, the repair module 306 may obtain a repair code pattern of the repair candidate. For example, in some embodiments, the repair module 306 may be configured to obtain the repair code pattern such as described in U.S. patent application Ser. No. 15/822,106.

In some embodiments, the repair module 306 may be configured to access a common code pattern database 314. The common code pattern database 314 may include common code patterns that may be derived from big code. For example, the common code patterns may be derived from existing code of existing software programs that may be stored in one or more repositories of existing software programs. In some embodiments, the common code patterns may be obtained such as described in U.S. patent application Ser. No. 15/822,106.

Additionally or alternatively, in some embodiments, the existing source code of the existing software programs may be obtained by the trimming module 202 of FIG. 2 to remove secondary modifications that may be included in the existing source code to generate modified existing source code. In these or other embodiments, the common code patterns may be obtained from the modified existing source code, which may improve the efficiency of identification of common code patterns.

In some embodiments, the repair module 306 may be configured to select or prioritize repair candidates for the correction of error based on associations between code patterns of the repair candidates and the common code patterns such as described in U.S. patent application Ser. No. 15/822,106.

Additionally or alternatively, in some embodiments, the repair module 306 may be configured to obtain big code inferred events 316. The big code inferred events 316 may be events inferred with respect to changes made in big code. In some embodiments, the big code inferred events may be analogous to the inferred events 108 of FIG. 1. In these or other embodiments, the repair module may be configured to prioritize or select repair candidates based on the big code inferred events.

For example, the big code inferred events may include a particular change in that corresponds to an event of correction of a particular type of error. Additionally, the error detection may identify a particular error of the code under test 304 that is of the particular error type. In some embodiments, the repair module 306 may be configured to select or prioritize repair candidates that are similar to the particular change.

In some embodiments, the repair module 306 may also be configured to perform repairs on the code under test 304 based on the prioritization of the repair candidates. For example, the repair module 306 may implement as potential repairs, the repair candidates in descending order from highest prioritization to lowest prioritization. Additionally or alternatively, the repair module 306 may be configured to output the modified code under test 308, which may include one or more repairs that may be implemented based on the prioritization of the repair candidates.

As indicated above, in some embodiments, the repair module 306 may include the analysis module to identify one or more inferred events that may occur with respect to different iterations of the code under test 304. In these or other embodiments, the repair module 306 may include a commit message module such as the commit message module 110 of FIG. 1. In some embodiments, the repair module 306 may be configured to generate commit messages with respect to the code under test 304 using the commit message module and the inferred events, such as described above with respect to FIG. 1. In some embodiments, the commit messages that correspond to the code under test 304 may be used in the development and testing of the code under test 304 in the generation of the modified code under test 308.

Modifications, additions, or omissions may be made to FIG. 3 without departing from the scope of the present disclosure. For example, the environment 300 may include more or fewer elements than those illustrated and described in the present disclosure. In addition, in some embodiments, one or more routines, one or more instructions, or at least a portion of code of the repair module 306, the test suites 311, and the repair template 312 may be combined such that they may be considered the same element or may have common sections that may be considered part of two or more of the repair module 306, the test suites 311, and the repair template 312.

Figure 4:
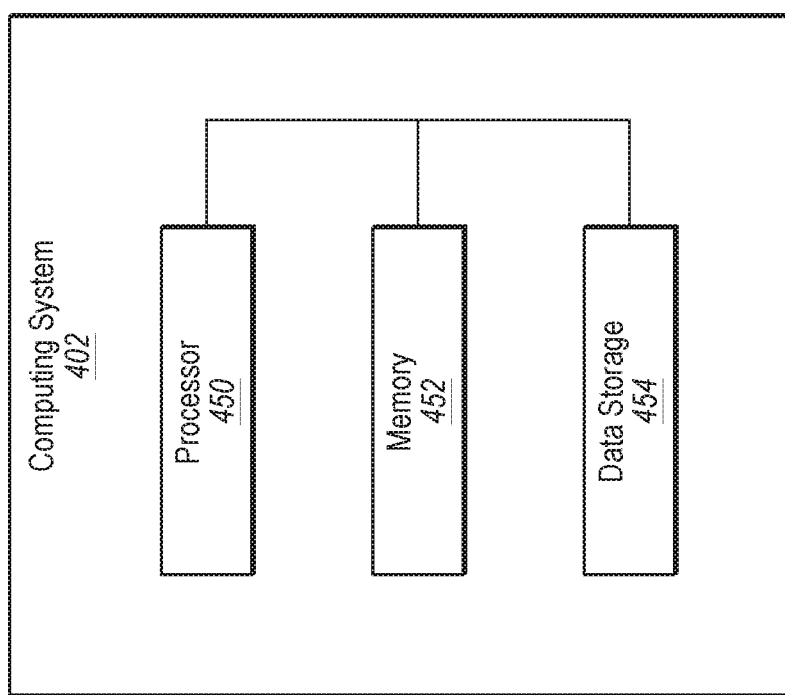
FIG. 4 illustrates a block diagram of an example computing system.

FIG. 4 illustrates a block diagram of an example computing system 402, according to at least one embodiment of the present disclosure. The computing system 402 may be configured to implement or direct one or more operations associated with an analysis module (e.g., the analysis module 106 of FIG. 1), a commit message module (e.g., the commit message module 110 of FIG. 1), a trimming module (e.g., the trimming module 202 of FIG. 2), and/or a repair module (e.g., the repair module 306 of FIG. 3). The computing system 402 may include a processor 450, a memory 452, and a data storage 454. The processor 450, the memory 452, and the data storage 454 may be communicatively coupled.

In general, the processor 450 may include any suitable special-purpose or general-purpose computer, computing entity, or processing device including various computer hardware or software modules and may be configured to execute instructions stored on any applicable computer-readable storage media. For example, the processor 450 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, the processor 450 may include any number of processors configured to, individually or collectively, perform or direct performance of any number of operations described in the present disclosure. Additionally, one or more of the processors may be present on one or more different electronic devices, such as different servers.

In some embodiments, the processor 450 may be configured to interpret and/or execute program instructions and/or process data stored in the memory 452, the data storage 454, or the memory 452 and the data storage 454. In some embodiments, the processor 450 may fetch program instructions from the data storage 454 and load the program instructions in the memory 452. After the program instructions are loaded into memory 452, the processor 450 may execute the program instructions.

For example, in some embodiments, one or more of the above mentioned modules (e.g., the analysis module, the commit message module, the trimming module, and/or the repair module) may be included in the data storage 454 as program instructions. The processor 450 may fetch the program instructions of a corresponding module from the data storage 454 and may load the program instructions of the corresponding module in the memory 452. After the program instructions of the corresponding module are loaded into memory 452, the processor 450 may execute the program instructions such that the computing system may implement the operations associated with the corresponding module as directed by the instructions.

The memory 452 and the data storage 454 may include computer-readable storage media for carrying or having computer-executable instructions or data structures stored thereon. Such computer-readable storage media may include any available media that may be accessed by a general-purpose or special-purpose computer, such as the processor 450. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer.

Combinations of the above may also be included within the scope of computer-readable storage media. Computer-executable instructions may include, for example, instructions and data configured to cause the processor 450 to perform a certain operation or group of operations.

Modifications, additions, or omissions may be made to the computing system 402 without departing from the scope of the present disclosure. For example, in some embodiments, the computing system 402 may include any number of other components that may not be explicitly illustrated or described.

Figure 5:
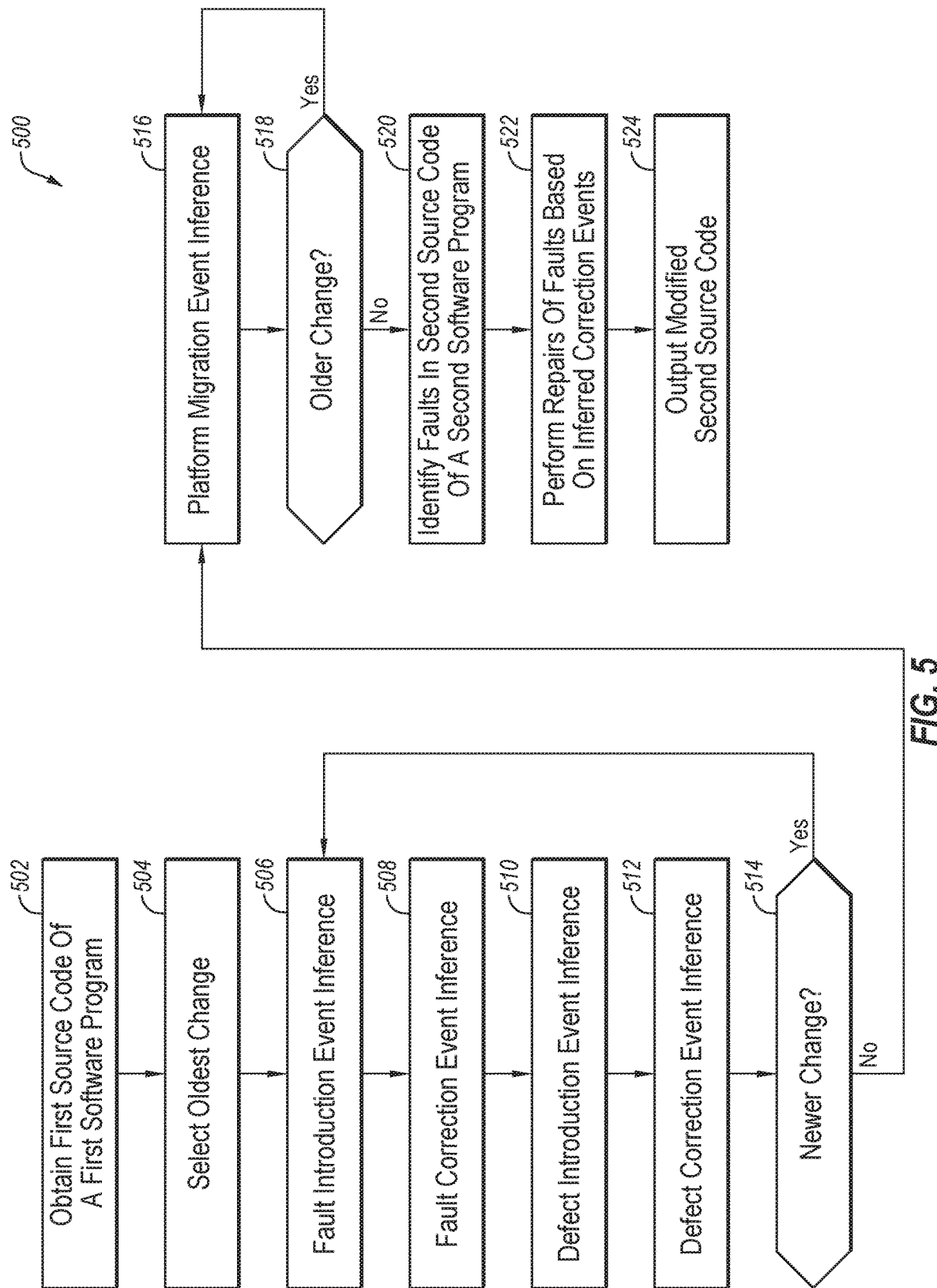
FIG. 5 is a flowchart of an example method of inferring events that occur with respect to a software program.

FIG. 5 is a flowchart of an example method 500 of inferring events that occur with respect to a software program, according to at least one embodiment described in the present disclosure. The method 500 may be performed by any suitable system, apparatus, or device with respect to code under test. For example, one or more of the analysis module 106 of FIG. 1, the commit message module 110 of FIG. 1, and the repair module 306 of FIG. 3 or the computing system 402 of FIG. 4 (e.g., as directed by one or more modules) may perform one or more of the operations associated with the method 500. Although illustrated with discrete blocks, the steps and operations associated with one or more of the blocks of the method 500 may be divided into additional blocks, combined into fewer blocks, or eliminated, depending on the particular implementation.

The method 500 may begin at block 502, where first source code of a first software program may be obtained. In some embodiments, multiple iterations of the first source code may be obtained in which one or more changes (which may each include one or more modifications) may have occurred with respect to the first source code between iterations.

In some embodiments, the method 500 may include determining multiple event correspondences in which each event correspondence indicates a correspondence between a respective change made to the first source code between iterations. In these or other embodiments, the event correspondences may be determined by performing one or more event type inference operations using two or more of the iterations. In some embodiments, the event type inference operations may be performed according to blocks 504, 506, 508, 510, 512, 514, 516, and 518 described below.

At block 504, an oldest change may be selected. For instance, as indicated above, each iteration of the first source code may be due to one or more changes being made to a previous iteration. As such, based on the obtained iterations of the source code at block 502, multiple changes made to the first source code may be identified. At block 504, in some embodiments, of the identified changes, the change that is the oldest change or in other words the change that was made prior to all of the other changes may be selected.

In some embodiments, the method 500 may include performing fault introduction event inference operations with respect to the selected change at block 506. The fault introduction event inference operations may be used to determine whether the selected change introduced a fault in the first source code. As such, in some embodiments, at block 506, it may be determined whether a fault introduction event corresponds to the selected change.

For instance, in some embodiments, at block 506 one or more software tests may be performed with respect to the first source code without the selected change being included in the first source code. Additionally, the same software tests may be performed with respect to the first source code with the selected change being included in the first source code. In some instances, a first software test of the first source code may have passed without the selected change being included in the first source code and may have failed with the selected change being included in the first source code. In some embodiments, the first software test may be identified based on it having passed and then having failed. In these or other embodiments, it may be determined that a fault introduction event corresponds to the selected change in response to identifying the first software test based on it having passed and then having failed. In some embodiments, the determination as to whether a fault introduction event corresponds to the selected change may be made by performing one or more operations of the method 600 of FIG. 6 as discussed below.

In some embodiments, the method 500 may include performing fault correction event inference operations with respect to the selected change at block 508. The fault correction event inference operations may be used to determine whether the selected change corrected a fault in the first source code. As such, in some embodiments, at block 508, it may be determined whether a fault correction event corresponds to the selected change.

For instance, in some embodiments, at block 508 and similar to as described with respect to block 506 one or more software tests may be performed with respect to the first source code without the selected change being included in the first source code. Additionally, the same software tests may be performed with respect to the first source code with the selected change being included in the first source code. In some instances, a second software test of the first source code may have failed without the selected change being included in the first source code and may have passed with the selected change being included in the first source code. In some embodiments, the second software test may be identified based on it having failed and then having passed. In these or other embodiments, it may be determined that a fault correction event corresponds to the selected change in response to identifying the second software test based on it having failed and then having passed. In some embodiments, the determination as to whether a fault correction event corresponds to the selected change may be made by performing one or more operations of the method 600 of FIG. 6, as discussed in detail below.

In some embodiments, the method 500 may include performing defect introduction event inference operations with respect to the selected change at block 510. The defect introduction event inference operations may be used to determine whether the selected change introduced a defect in the first source code. As such, in some embodiments, at block 510, it may be determined whether a defect introduction event corresponds to the selected change. In the present disclosure, use of the terms "defect" and "fault" may both refer to errors that may be found in source code. In the present disclosure the different terms are used with respect to FIGS. 5, 6, and 7, and with respect to the claims to differentiate how the errors may be identified. In particular, "fault" is used in the context of identifying error introduction events and error correction events using test suites. Additionally, "defect" is used in the context of identifying error introduction events and error correction using a static analysis.

For instance, in some embodiments, at block 510 a first static analysis may be performed with respect to the first source code without the selected change being included in the first source code. Additionally, a second static analysis may be performed with respect to the first source code with the selected change being included in the first source code. In some instances, a first defect may be identified from the second static analysis. Additionally, the first defect may not have been identified from the first static analysis. In these or other embodiments, it may be determined that a defect introduction event corresponds to the selected change in response to the first defect being identified from the second static analysis but not being identified from the first static analysis. In some embodiments, the determination as to whether a defect introduction event corresponds to the selected change may be made by performing one or more operations of the method 700 of FIG. 7, as discussed in detail below.

In some embodiments, the method 500 may include performing defect correction event inference operations with respect to the selected change at block 512. The defect correction event inference operations may be used to determine whether the selected change corrected a defect in the first source code. As such, in some embodiments, at block 512, it may be determined whether a defect correction event corresponds to the selected change.

For instance, in some embodiments, at block 512, similar as to with block 514, a first static analysis may be performed with respect to the first source code without the selected change being included in the first source code. Additionally, a second static analysis may be performed with respect to the first source code with the selected change being included in the first source code. In some instances, a second defect may be identified from the first static analysis. Additionally, the second defect may not have been identified from the second static analysis. In these or other embodiments, it may be determined that a defect correction event corresponds to the selected change in response to the second defect being identified from the first static analysis but not being identified from the second static analysis. In some embodiments, the determination as to whether a defect correction event corresponds to the selected change may be made by performing one or more operations of the method 700 of FIG. 7, as discussed in detail below.

Following one or more operations performed at one or more of blocks 506, 508, 510, and 512, another change may be selected. For example, at block 504, the oldest change may have been selected as discussed above. In some embodiments, at block 514 it may be determined whether there is a newer change that has not been analyzed in which the newer change is newer than the previously selected change at block 504. In some embodiments, in response to there being a newer change, the newer change may be selected and one or more of the operations of one or more of blocks 506, 508, 510, and 512 may be performed with respect to the newly selected change. In some embodiments, the newly selected change may be selected in response to the newly selected change being the next oldest change as compared to the previously selected change. In some embodiments, the above recited operations with respect to blocks 506, 508, 510, 512, and 514 may be repeated until every change has been analyzed with respect to one or more of blocks 506, 508, 510, and 512.

Modifications may be made to the above in some embodiments. For example, in some instances operations may be performed with respect to only one of blocks 506, 508, 510, or 512 with respect to a particular change. Additionally or alternatively, operations may be performed with respect to one of blocks 506, 508, 510, or 512 and if a corresponding event correspondence is not identified with respect to the particular block, the method 500 may proceed to another one of blocks 506, 508, 510, or 512. Additionally or alternatively, in response to a particular event correspondence being determined for a particular change with respect to one of blocks 506, 508, 510, or 512, the remaining of such blocks may be skipped with respect to the particular change.

In some embodiments, the method 500 may include performing platform migration event inference operations with respect a particular change at block 512. In the illustrated example implementation of FIG. 5, the particular change may be the newest (or most recent) change that has been made to the first source code. Additionally or alternatively, the particular change may be any other change that may have been made to the first source code.

The platform migration inference operations may be used to determine whether the particular change corresponded to a platform migration of the first source code. As such, in some embodiments, at block 516, it may be determined whether a platform migration event corresponds to the particular change.

A platform migration may include modifications made to the first source code such that the first source code may be used with a different platform or a different version of a platform. For example, a platform migration event may include a migration from a first platform to a second platform. Additionally or alternatively, a platform migration event may include a migration from a first version of a particular platform to a second version of a particular platform. A platform may include a compiler used to compile the first source code, a library used with respect to the first source code, an operating system that runs the software program that includes the first software program. In some embodiments, the determination as to whether a platform migration event corresponds to the particular change may be made by performing one or more operations of the method 700 of FIG. 7, as discussed in detail below. In some embodiments, the operations of block 516 may be repeated for each possible different platform that may correspond to the first source code.

Following block 516, another change may be selected. For example, at block 514, the newest change may have been selected to perform platform migration event inference operations. In some embodiments, at block 518 it may be determined whether there is an older change that has not been analyzed in which the older change is older than the previously selected change at block 514. In some embodiments, in response to there being an older change, the older change may be selected and one or more of the operations of block 516 may be performed with respect to the newly selected change. In some embodiments, the newly selected change may be selected in response to the newly selected change being the next newest change as compared to the previously selected change at block 514. In some embodiments, the above recited operations with respect to blocks 514, 516, and 518 may be repeated until every change has been analyzed with respect to block 516.

In some embodiments, one or more operations may be performed based on the event correspondences that may be performed at blocks 504, 506, 508, 510, 512, 514, 516, and 518. For example, in some embodiments, an event inference may be identified for each of one or more of the changes based on the determined event correspondences such as described above. In these or other embodiments, one or more commit messages may be generated based on the identified event inferences such as also described above.

As another example, in some embodiments, one or more repair operations may be performed with respect to second source code of a second software program based on the event correspondences. In some embodiments, the code under test 304 of FIG. 3 may be an example of the second source code.

For instance, in some embodiments, the method 500 may include blocks 520, 522, and 524. At block 520, one or more errors may be identified in the second source code. The error identification may be performed with respect to the second source code using any suitable technique. For example, in some embodiments, the error identification may be performed based on performing a test execution of the one or more test suites with respect to the second source code.

At block 522, repairs of the identified errors may be performed based on the event correspondences that may be determined with respect to the first source code. For example, as indicated above, in some embodiments, the inferred events with respect to the first source code that may be obtained from the event correspondences may be analogous to the big code inferred events described above with respect to FIG. 3. In these or other embodiments, one or more of the first source code inferred events may be used to identify or prioritize one or more repair candidates that may be made to the second source code to correct errors that may be similar to those included in the inferred events, such as described above with respect to FIG. 3. In these or other embodiments, the similarity between the repair candidates and changes that correspond to the inferred events may be determined based on code patterns that may be determined for the repair candidates and the changes. In these or other embodiments, one or more commit messages that may be generated with respect to the inferred events that correspond to the first source code may be used to identify possible causes of the errors based on the similarities between the changes included in the inferred events and changes made to the second source code.

At block 524, modified second source code may be output. The modified second source code may include modifications that may include one or more repair candidates that may be implemented based on the repair prioritization described above such that the modified second source code may include a repaired version of the second source code.

The method 500 may improve the efficiency and efficacy of software program testing and repair. For example, the determining of the prioritization of repair candidates as described help make better determinations as to the effectiveness of repair candidates.

Modifications, additions, or omissions may be made to the method 500 without departing from the scope of the present disclosure. For example, the operations of method 500 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

For example, in some embodiments, the operations described with respect to performing event type inference operations may be performed with respect to the second source code. Additionally or alternatively, one or more second source code inferred events may be determined. In these or other embodiments, one or more corresponding second source code commit messages may be generated. In some embodiments, the second source code inferred events and/or commit messages may be used to repair the second source code. For instance, a second source code inferred event may indicate that a fault or defect introduction event occurred with respect to a particular change made to the second source code. In some embodiments, the particular change may thus be identified and modified to correct the second source code. Additionally or alternatively, a fault or defect correction event that corrects a similar fault or defect may be identified from the first source code inferred events. In these or other embodiments, the change to the first source code that corresponds to the identified fault or defect correction event may be used to select a repair candidate to correct the similar fault or defect identified from the second source code inferred events.

Figure 6:
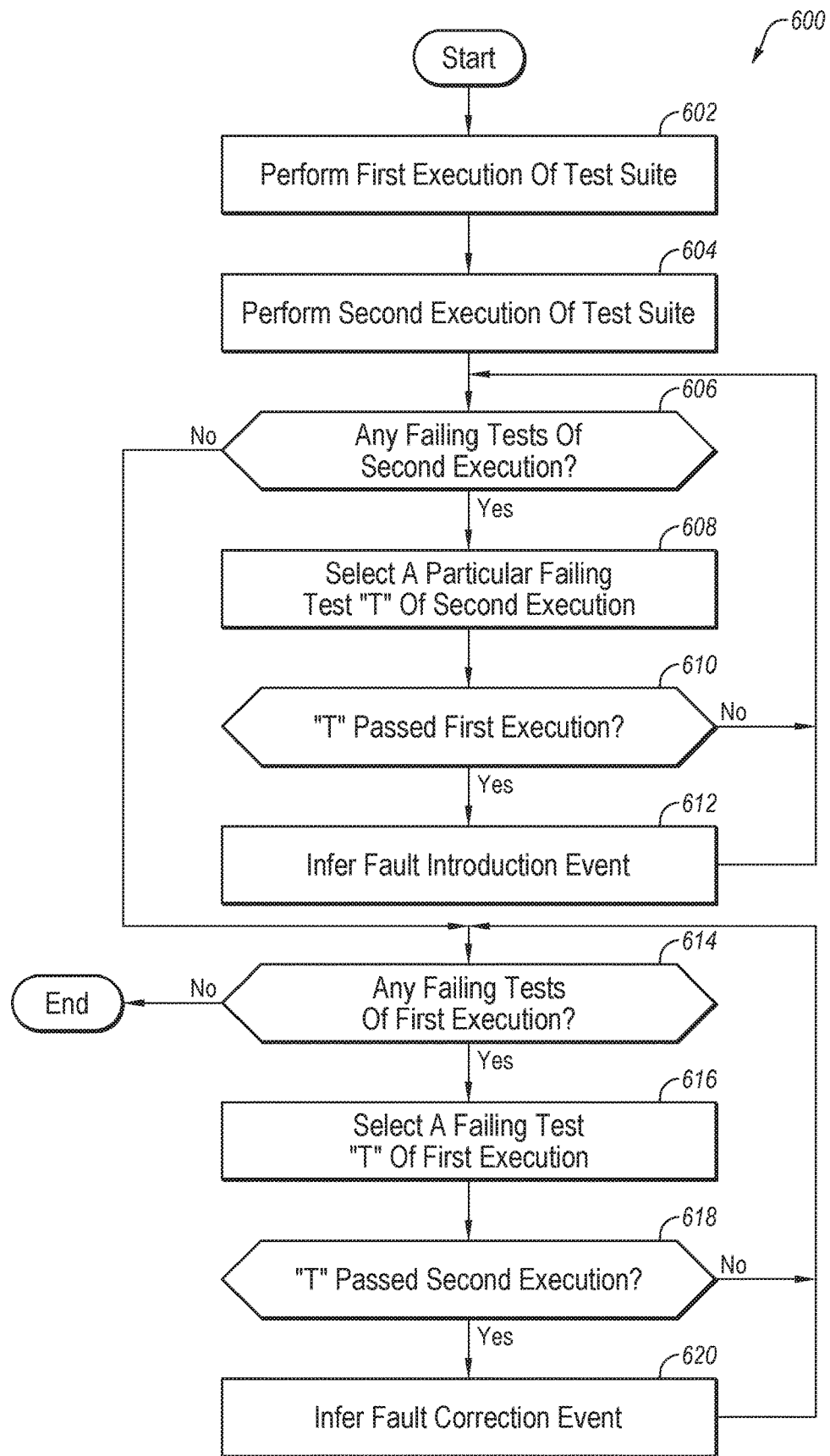
FIG. 6 is a flowchart of an example method of performing fault introduction event and fault correction event inference operations.

FIG. 6 is a flowchart of an example method 600 of performing fault introduction event and fault correction event inference operations, according to at least one embodiment described in the present disclosure. In some embodiments, the method 600 may be performed to determine whether a particular change of source code of a software program may correspond to a fault introduction event or a fault correction event. Additionally, as indicated above, in some embodiments, one or more of the operations of blocks 506 and 508 described above with respect to the method 500 of FIG. 5 may be performed according to the method 600. As such, in some embodiments, the selected change discussed above with respect to the method 500 of FIG. 5 may be the particular change referred to in the description of the method 600. Additionally or alternatively, the source code referred to in the description of the method 600 may be the first source code or the second source code discussed above with respect to the method 500 of FIG. 5.

The method 600 may be performed by any suitable system, apparatus, or device with respect to code under test. For example, one or more of the analysis module 106 of FIG. 1 and the repair module 306 of FIG. 3 or the computing system 402 of FIG. 4 (e.g., as directed by one or more modules) may perform one or more of the operations associated with the method 600. Although illustrated with discrete blocks, the steps and operations associated with one or more of the blocks of the method 600 may be divided into additional blocks, combined into fewer blocks, or eliminated, depending on the particular implementation.

The method 600 may begin at block 602, where one or more software tests may be performed with respect to the source code without the particular change being included in the source code. In some embodiments, the one or more software tests may be performed by performing a first execution of a test suite with respect to the source code in a first iteration of the source code in which the particular change is omitted from the source code.

At block 604, the same one or more software tests may be performed with respect to the source code with the particular change being included in the source code. In some embodiments, the one or more software tests may be performed by performing a second execution of the test suite with respect to the source code in a second iteration of the source code in which the particular change is included in the source code.

At block 606, it may be determined whether there are any failing tests with respect to the second test execution. In response to there not being any failing tests with respect to the second test execution, the method 600 may proceed from block 606 to block 614. In response to there being at least one failing test with respect to the second test execution, the method 600 may proceed from block 606 to block 608. At block 608, a particular failing test of the second test execution may be selected.

At block 610 it may be determined whether the particular failing test of the second test execution was a passing test with respect to the first test execution. In response to the particular failing test of the second test execution being a passing test with respect to the first test execution, the method 600 may proceed from block 610 to block 612. At block 612, it may be determined that a fault introduction event corresponds to the particular change based on the particular failing test of the second test execution being a passing test with respect to the first test execution.

Following block 612, the method 600 may return to block 606. Additionally, referring back to block 610, in response to the particular failing test not being a passing test with respect to the first test execution, the method 600 may procced from block 610 back to block 606.

After proceeding back to block 606 from block 610 or 612, it may be determined whether there are any other failing tests with respect to the second test execution that have not been analyzed with respect to blocks 608, 610, or 612. In response to there being other failing tests with respect to the second test execution that have not been analyzed with respect to blocks 608, 610, or 612, the method 600 may proceed from block 606 back to block 608. In some embodiments, the operations of blocks 606, 608, 610, and 612 may be repeated until all failing tests with respect to the second test execution have been analyzed with respect to blocks 608, 610, and 612.

In response to there being no failing tests with respect to the second test execution or in response to all the failing tests with respect to the second test execution being analyzed with respect to blocks 608, 610, and 612, the method 600 may proceed from block 606 to block 614.

At block 614, it may be determined whether there are any failing tests with respect to the first test execution of the source code. In response to there not being any failing tests with respect to the first test execution, the method 600 may end. In response to there being at least one failing test with respect to the first test execution, the method 600 may proceed from block 614 to block 616. At block 616, a particular failing test of the first test execution may be selected.

At block 618 it may be determined whether the particular failing test of the first test execution was a passing test with respect to the second test execution. In response to the particular failing test of the first test execution being a passing test with respect to the second test execution, the method 600 may proceed from block 618 to block 620. At block 620, it may be determined that a fault correction event corresponds to the particular change based on the particular failing test of the first test execution being a passing test with respect to the second test execution.

Following block 620, the method 600 may return to block 614. After proceeding back to block 614 from block 620, it may be determined whether there are any other failing tests with respect to the first test execution that have not been analyzed with respect to blocks 616, 618, or 620. In response to there being other failing tests with respect to the first test execution that have not been analyzed with respect to blocks 616, 618, or 620, the method 600 may proceed from block 614 back to block 616. In some embodiments, the operations of blocks 614, 616, 618, and 620 may be repeated until all failing tests with respect to the first test execution have been analyzed with respect to blocks 616, 618, and 620. In response to it being determined at block 614 that all the failing tests with respect to the first test execution have been analyzed with respect to blocks 616, 618, and 620, the method 600 may end.

Modifications, additions, or omissions may be made to the method 600 without departing from the scope of the present disclosure. For example, the operations of method 600 may be implemented in differing order. For instance, in some embodiments operations 614, 616, 618, and 620 may be performed prior to operations 606, 608, 610, and 612 in some embodiments. As another example, the operations of blocks 602 and 604 may be performed in a different order than described. Additionally or alternatively, two or more operations may be performed at the same time. For instance, in some embodiments, operations 606, 608, 610, and 612 may be performed concurrently with operations 614, 616, 618, and 620 in some embodiments. As another example, the operations of blocks 602 and 604 may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 7:
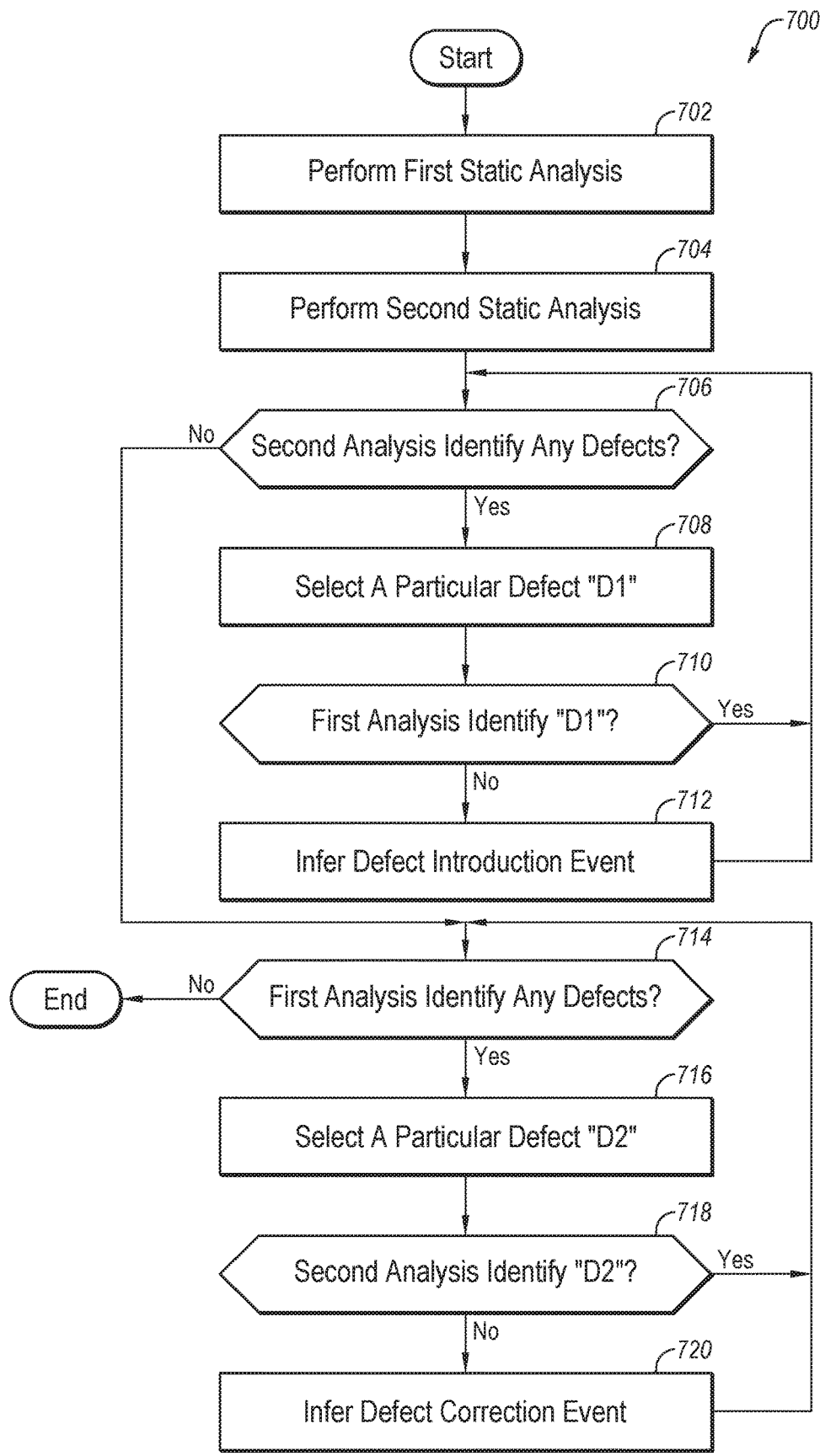
FIG. 7 is a flowchart of an example method of performing defect introduction event and defect correction event inference operations.

FIG. 7 is a flowchart of an example method 700 of performing defect introduction event and defect correction event inference operations, according to at least one embodiment described in the present disclosure. In some embodiments, the method 700 may be performed to determine whether a particular change of source code of a software program may correspond to a defect introduction event or a defect correction event. Additionally, as indicated above, in some embodiments, one or more of the operations of blocks 510 and 512 described above with respect to the method 500 of FIG. 5 may be performed according to the method 700. As such, in some embodiments, the selected change discussed above with respect to the method 500 of FIG. 5 may be the particular change referred to in the description of the method 700. Additionally or alternatively, the source code referred to in the description of the method 700 may be the first source code or the second source code discussed above with respect to the method 500 of FIG. 5.

The method 700 may be performed by any suitable system, apparatus, or device with respect to code under test. For example, one or more of the analysis module 106 of FIG. 1 and the repair module 306 of FIG. 3 or the computing system 402 of FIG. 4 (e.g., as directed by one or more modules) may perform one or more of the operations associated with the method 700. Although illustrated with discrete blocks, the steps and operations associated with one or more of the blocks of the method 700 may be divided into additional blocks, combined into fewer blocks, or eliminated, depending on the particular implementation.

The method 700 may begin at block 702, where a first static analysis may be performed with respect to a first iteration of the source code that has the particular change omitted from the source code. At block 704, a second static analysis may be performed with respect to a second iteration of the source code that has the particular change included therein.

At block 706, it may be determined whether the second static analysis identified any defects with respect to the second iteration of the source code. In response to the second static analysis not identifying any defects with respect to the second iteration, the method 700 may proceed from block 706 to block 714. In response to the second static analysis identifying at least one defect with respect to the second iteration, the method 700 may proceed from block 706 to block 708. At block 708, a particular defect of the second iteration identified from the second static analysis may be selected.

At block 710 it may be determined whether the particular defect of the second iteration was identified from the first static analysis performed with respect to the first iteration. In response to the particular defect not being identified from the first static analysis, the method 700 may proceed from block 710 to block 712. At block 712, it may be determined that a defect introduction event corresponds to the particular change based on the particular defect being identified from the second static analysis but not being identified from the first static analysis.

Following block 712, the method 700 may return to block 706. Additionally, referring back to block 710, in response to the particular defect being identified from the second static analysis and from the first static analysis, the method 700 may proceed from block 710 back to block 706.

After proceeding back to block 706 from block 710 or 712, it may be determined whether there are any other defects identified from the second static analysis with respect to the second iteration that have not been analyzed with respect to blocks 708, 710, or 712. In response to there being other defects identified from the second static analysis with respect to the second iteration that have not been analyzed with respect to blocks 708, 710, or 712, the method 700 may proceed from block 706 back to block 708. In some embodiments, the operations of blocks 706, 708, 710, and 712 may be repeated until defects identified from the second static analysis with respect to the second iteration have been analyzed with respect to blocks 708, 710, and 712.

In response to there being no more defects identified from the second static analysis with respect to the second iteration that have not been analyzed with respect to blocks 708, 710, or 712, the method 700 may proceed from block 706 to block 714.

At block 714, it may be determined whether the first static analysis identified any defects with respect to the first iteration of the source code. In response to there not being any defects identified from the first static analysis with respect to the first iteration, the method 700 may end. In response to there being at least one defect identified from the first static analysis with respect to the first iteration, the method 700 may proceed from block 714 to block 716. At block 716, a particular defect identified from the first static analysis may be selected.

At block 718 it may be determined whether the particular defect identified from the first static analysis was identified from the second static analysis performed with respect to the second iteration. In response to the particular defect being identified from the first static analysis but not the second static analysis, the method 700 may proceed from block 718 to block 720. At block 720, it may be determined that a defect correction event corresponds to the particular defect based on the first static analysis identifying the particular defect and the second static analysis not identifying the particular defect.

Following block 720, the method 700 may return to block 714. After proceeding back to block 714 from block 720, it may be determined whether there are any other defects identified from the first static analysis that have not been analyzed with respect to blocks 716, 718, or 720. In response to there being other defects identified from the first static analysis that have not been analyzed with respect to blocks 716, 718, or 720, the method 700 may proceed from block 714 back to block 716. In some embodiments, the operations of blocks 714, 716, 718, and 720 may be repeated until all defects identified from the first static analysis have been analyzed with respect to blocks 716, 718, and 720. In response to it being determined at block 714 that all the defects identified from the first static analysis have been analyzed with respect to blocks 716, 718, and 720, the method 700 may end.

Modifications, additions, or omissions may be made to the method 700 without departing from the scope of the present disclosure. For example, the operations of method 700 may be implemented in differing order. For instance, in some embodiments operations 714, 716, 718, and 720 may be performed prior to operations 706, 708, 710, and 712 in some embodiments. As another example, the operations of blocks 702 and 704 may be performed in a different order than described. Additionally or alternatively, two or more operations may be performed at the same time. For instance, in some embodiments, operations 706, 708, 710, and 712 may be performed concurrently with operations 714, 716, 718, and 720 in some embodiments. As another example, the operations of blocks 702 and 704 may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 8:
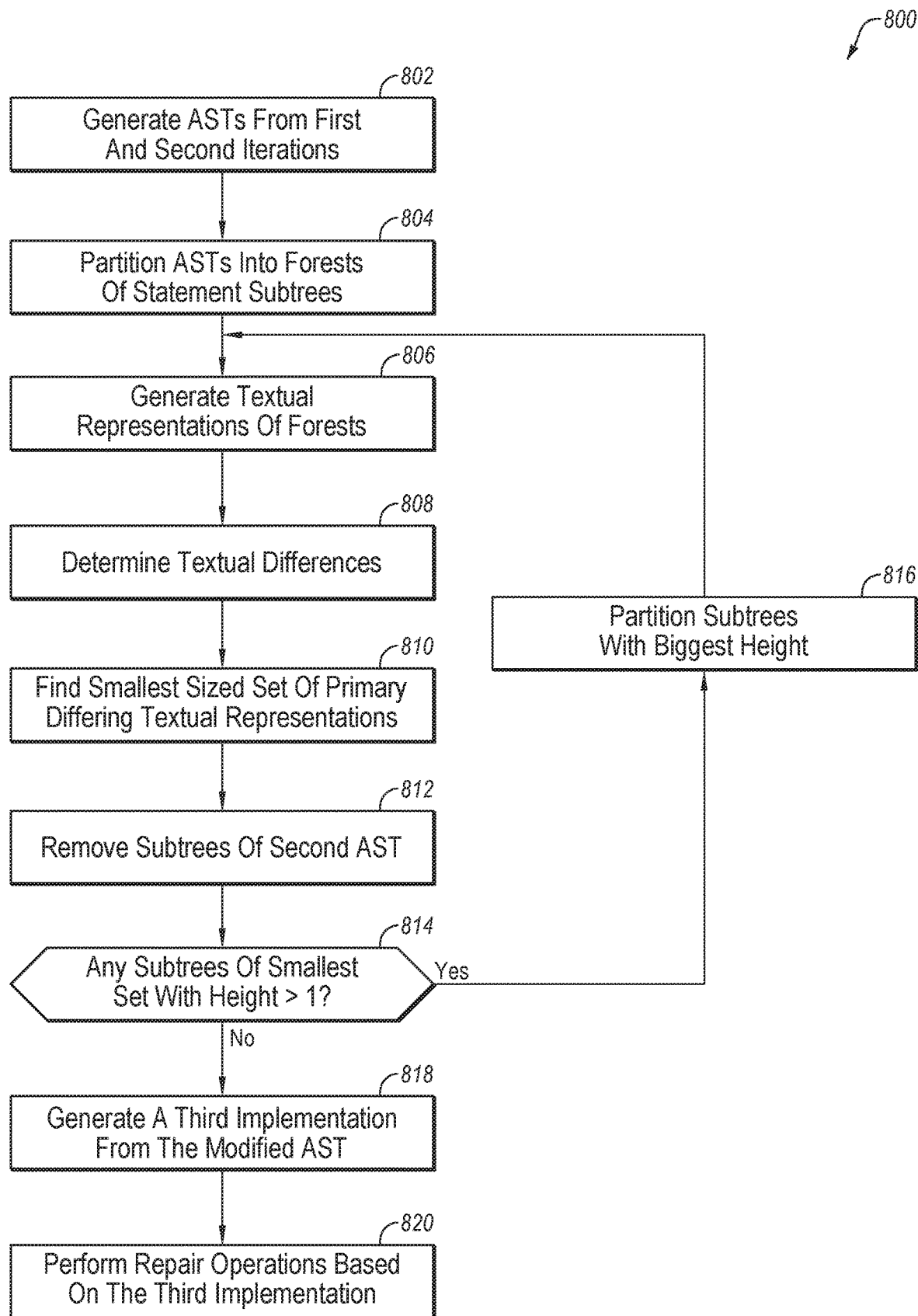
FIG. 8 is a flowchart of an example method of removing secondary modifications from source code of a software program.

FIG. 8 is a flowchart of an example method 800 of removing secondary modifications from source code of a software program, according to at least one embodiment described in the present disclosure. The method 800 may be performed by any suitable system, apparatus, or device with respect to code under test. For example, one or more of the trimming module 202 of FIG. 2 and the repair module 306 of FIG. 3 or the computing system 402 of FIG. 4 (e.g., as directed by one or more modules) may perform one or more of the operations associated with the method 800. Although illustrated with discrete blocks, the steps and operations associated with one or more of the blocks of the method 800 may be divided into additional blocks, combined into fewer blocks, or eliminated, depending on the particular implementation.

The method 800 may begin at block 802, where abstract syntax trees (ASTs) may be generated from multiple iterations of first source code of a first software program. In some embodiments, multiple iterations of the first source code may be obtained in which one or more changes (which may each include one or more modifications) may have occurred with respect to the first source code between iterations. In some embodiments, a first iteration of the first source code may be obtained in which the first iteration excludes a particular change in a particular portion of the first source code. Additionally or alternatively, a second iteration of the first source code may be obtained in which the second iteration includes the particular change in the particular portion of the first source code. In some embodiments, the particular change may include multiple modifications in which one or more of the modifications may be secondary modifications.

In some embodiments, a first AST may be generated with respect to the first iteration at block 802. In these or other embodiments, a second AST may be generated with respect to the second iteration at block 802.

Figure 9A:
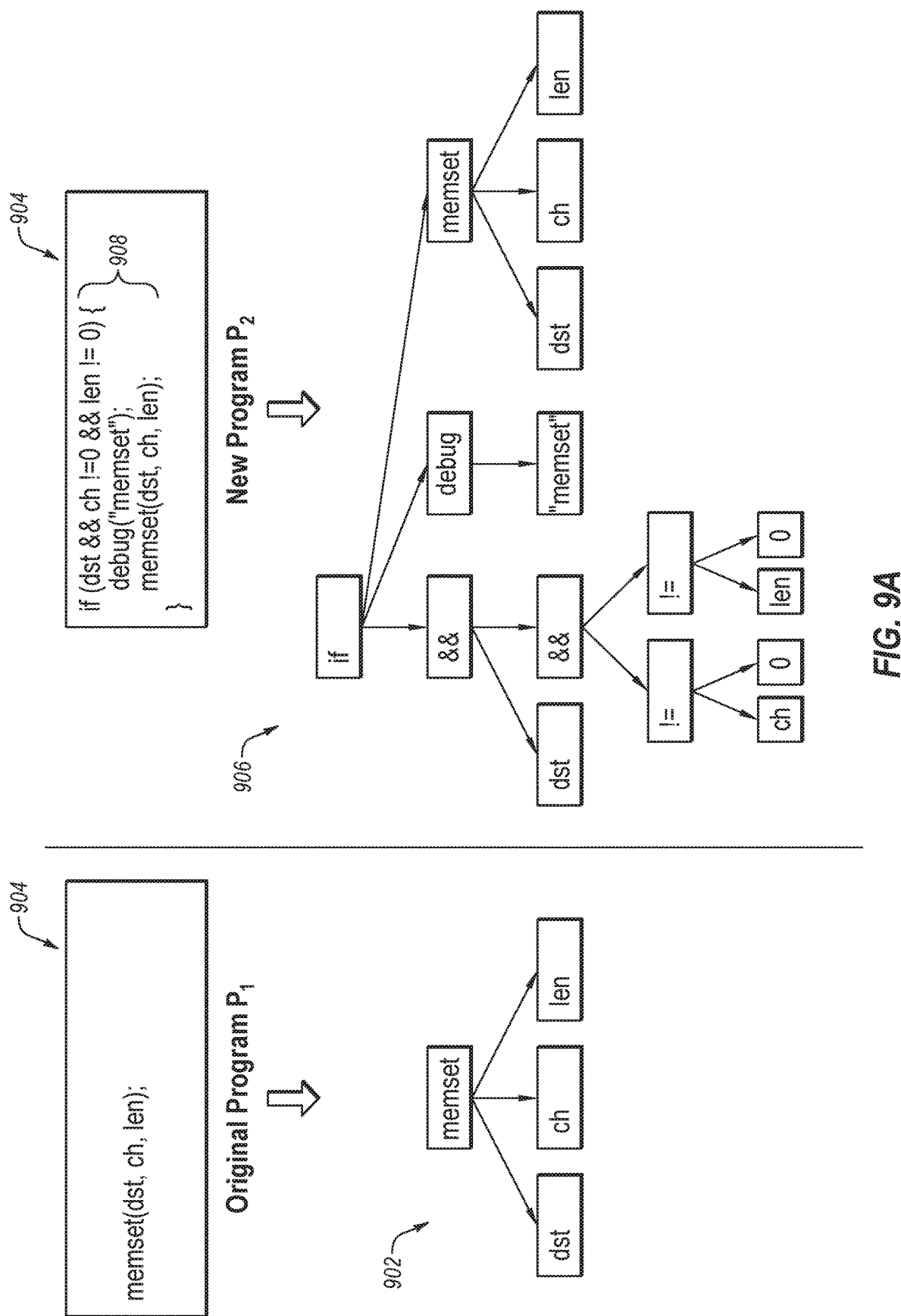
FIG. 9A illustrates example Abstract Syntax Trees (ASTs) that may be used in removing secondary modifications from source code.

For instance, FIG. 9A illustrates an example first AST 902 that may be generated with respect to a first iteration of source code that includes a particular portion 904. Additionally, FIG. 9A illustrates an example second AST 906 that may be generated with respect to a second iteration of the source code in which a particular change 908 that includes multiple modifications has been made to the particular portion 904.

Returning to FIG. 8, at block 804 the ASTs generated at block 802 may be partitioned into forests of one or more statement sub-trees. For example, in some embodiments, one or more first sub-trees of the first AST may be identified. The first sub-trees may correspond to the particular portion associated with the particular change and may be identified accordingly. In some embodiments, the first sub-trees may be identified according to statement calls included in the first source code. In these or other embodiments, the first AST may be partitioned according to the identified first sub-trees. Additionally or alternatively, multiple second sub-trees of the second AST may be identified. The multiple second sub-trees may also correspond to the particular portion associated with the particular change and may also be identified accordingly. In these or other embodiments, the second sub-tree may be partitioned according to the identified second sub-trees. In some instances, a particular sub-tree may be an entire AST such that the entire AST may be identified as the particular sub-tree.

Figure 9B:
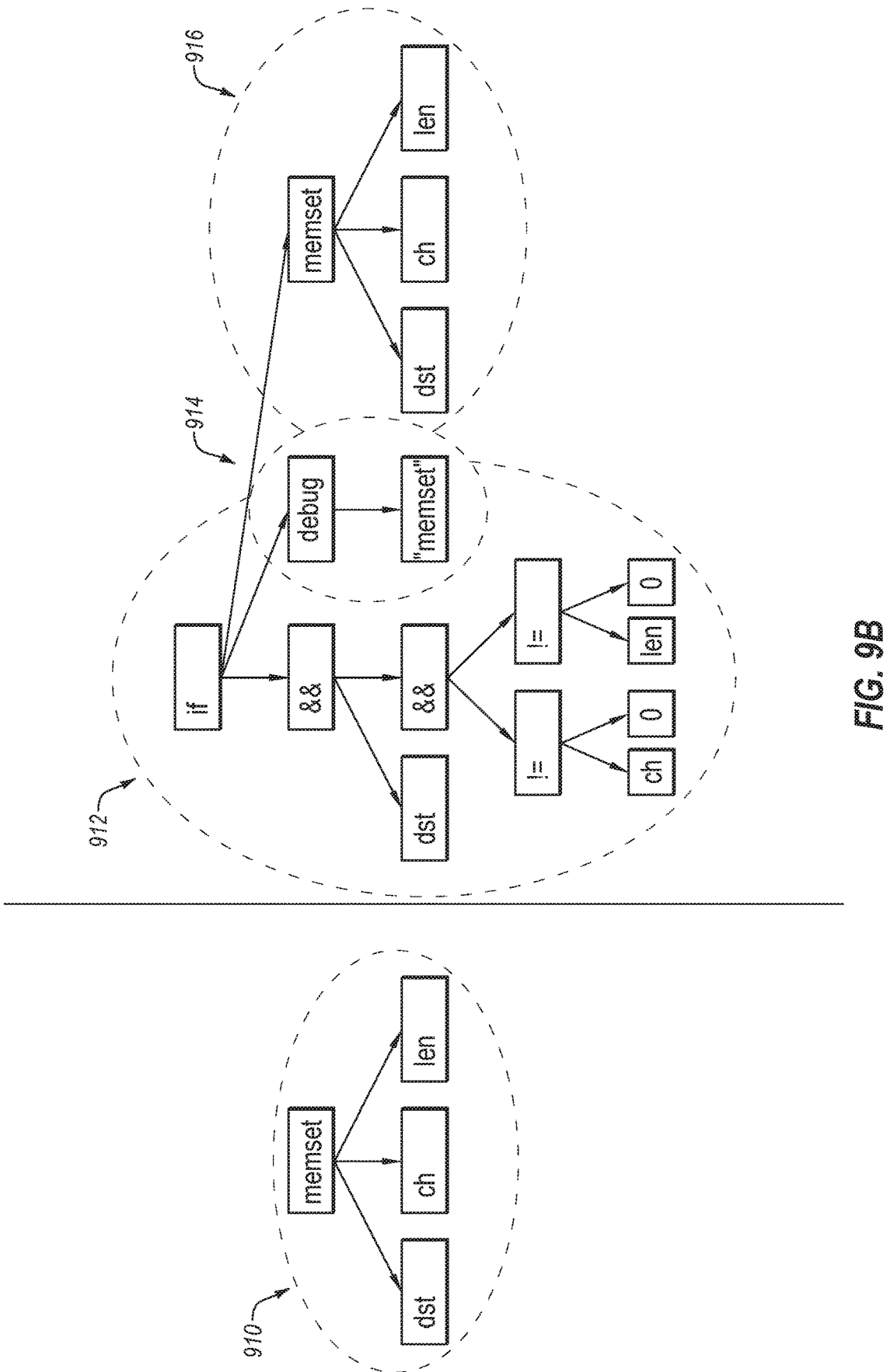
FIG. 9B illustrates example sub-trees of the ASTs of FIG. 9A.

For instance, FIG. 9B illustrates an example first sub-tree 910 that may be identified from the first AST 902 of FIG. 9A. In the particular example, the first sub-tree 910 may be all of the first AST 902 of FIG. 9A. FIG. 9B also illustrates second sub-trees 912, 914, and 916 that may be second sub-trees of the second AST 906 of FIG. 9A.

Returning to FIG. 8, at block 806, textual representations of the identified forests may be generated. For example, a first textual representation may be generated with respect to each first sub-tree and a second textual representation may be generated with respect to each second sub-tree. In some embodiments, the textual representations may include the lines of code that may correspond to the respective sub-trees.

For instance, FIG. 9C illustrates a first textual representation 918 that corresponds to the first sub-tree 910. As indicated by a comparison between FIGS. 9A and 9C, the first textual representation 918 may include the lines of code of the first iteration of the first source code at the particular portion 904 that correspond to the first sub-tree 910.

Additionally, FIG. 9C illustrates a second textual representation 920 that may correspond to the second sub-tree 912, a second textual representation 922 that may correspond to the second sub-tree 914, and a second textual representation 924 that may correspond to the second sub-tree 916.

Returning to FIG. 8. At block 808, textual differences between the textual representations may be determined to identify from the second textual representations differing textual representations that differ from the first textual representations. For example, in some embodiments, a different determination may be performed between each first textual representation and each second textual representation to identify which second textual representations are not the same as any of the first textual representations. The second textual representations that are not the same as any of the first textual representations may correspond to modifications made between the first iteration and the second iterations. Such second textual representations may be identified as differing textual representations.

By way of example, the first textual representation 918 may be compared against each of the second textual representation 920, the second textual representation 922, and the second textual representation 924 to determine which of the second textual representation 920, the second textual representation 922, and the second textual representation 924 differ from the first textual representation 918. Based on the difference determination performed from the comparison, it may be determined that the second textual representation 920 and the second textual representation 922 differ from the first textual representation. Additionally, it may be determined that the second textual representation 924 is the same as the first textual representation 918. In these or other embodiments, the second textual representation 920 may be identified as a differing textual representation "C1" and the second textual representation 922 may be identified as a differing textual representation "C2."

Returning to FIG. 8, at block 810 a smallest sized set of differing textual representations may be identified. In some embodiments, the smallest sized set of differing textual representations may be identified as the smallest number of differing textual representations that may be implemented with respect to the first source code such that the first source code corresponds to a same event as if the entire particular change were implemented with respect to the first source code. The identification of the smallest sized set of differing textual representations that correspond to the same event may indicate which modifications that correspond to the differing textual representations are secondary modifications and which may include primary modifications.

For instance, if a particular differing textual representation or set of differing textual representations does not correspond to a same event as the entire particular change, such differing textual representations likely correspond to secondary modifications. In contrast, if a particular differing textual representation or set of differing textual representations does correspond to the same event as the entire particular change, such differing textual representations likely correspond to primary modifications. As such, identifying which differing textual representations are outside of the smallest sized set that does correspond to the same event may identify the largest number of secondary modifications that may be trimmed.

In some embodiments, the operations of block 810 may include performing an event correspondence determination with respect to the particular change. In some embodiments, the event correspondence determination may identify the particular event as corresponding to the particular change. In some embodiments, one or more operations of the methods 500, 600, and/or 700 may be performed to perform the event correspondence determination with respect to the particular change. For instance, the modifications that correspond to all of the particular change may be used as the selected change described above with respect to methods 500, 600, and/or 700. In these or other embodiments, the first iteration of the first source code that corresponds to the first AST may be used as the iteration of the source code that does not include the selected change included therein.

In these or other embodiments, the operations of block 810 may include performing the event correspondence determination with respect to each possible set of differing textual representations in which each set of differing textual representations includes one or more differing textual representation. In some embodiments, one or more operations of the methods 500, 600, and/or 700 may be performed to perform the event correspondence determination with respect to each possible set. For instance, the modifications that correspond to each set and that may be with respect to the first iteration may correspond to the selected change described above with respect to the methods 500, 600, and/or 700. In these or other embodiments, the first iteration of the first source code that corresponds to the first AST may be used as the iteration of the source code that does not include the selected change included therein that is described with respect to the methods 500, 600, and/or 700.

Additionally or alternatively, the operations of block 810 may include identifying, as matching sets, which of the sets of differing textual representations correspond to the particular event. In these or other embodiments, the matching set identification may be based on the event correspondence determinations made with respect to the possible sets. Additionally, as indicated above, the matching set identification may identify which of the sets of differing textual representations may include primary modifications. Conversely, those sets of differing textual representations that are not matching sets may be those sets that include only secondary modifications.

In these or other embodiments, the operations of block 810 may include identifying, as the smallest sized set, a particular matching set that includes the fewest number of differing textual representations. In other words, the other matching sets may correspond to the primary modifications but may also correspond to more secondary modifications than the smallest-sized set. As such, those differing textual representations that are outside of the smallest-sized set may be considered as corresponding to secondary modifications.

Figure 9D:
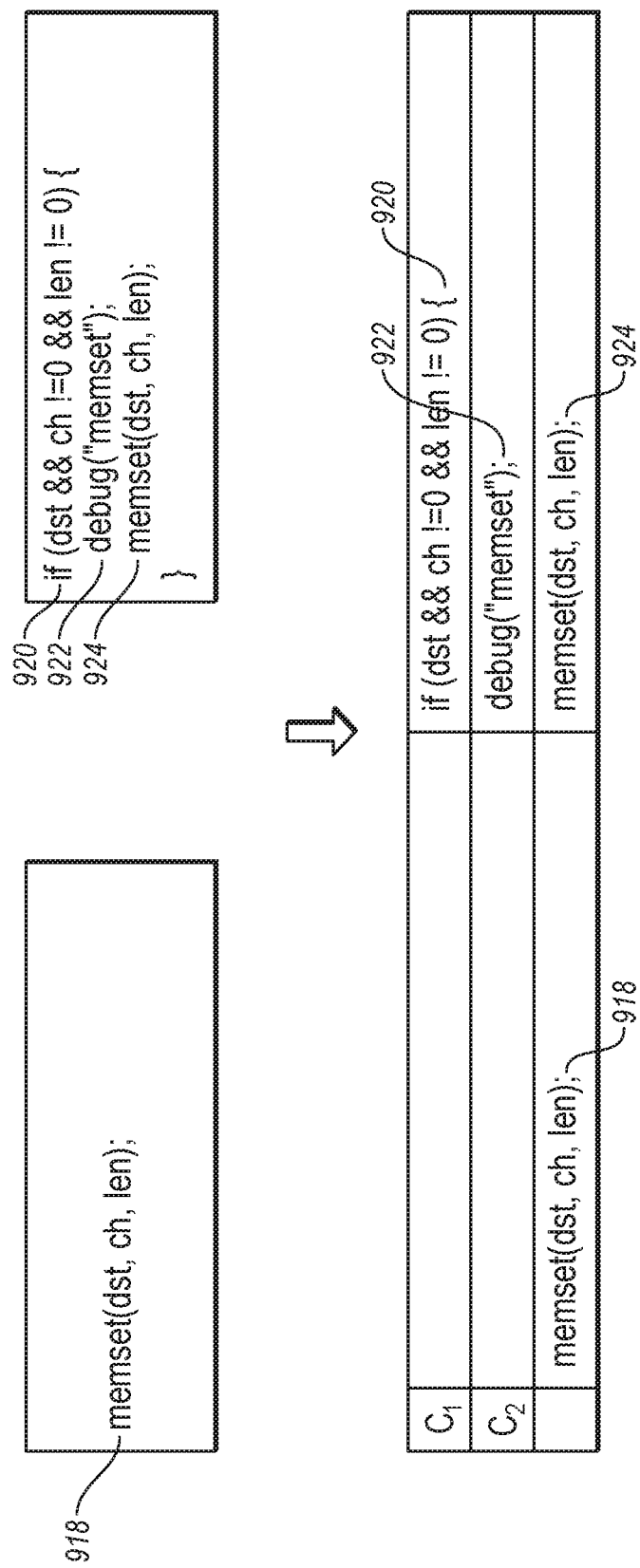
FIG. 9D illustrates example differing textual representations of the textual representations of FIG. 9C.

By way of example with respect to FIG. 9D, as indicated above, the difference determinations between the first textual representation 918 and each of the second textual representations 920, 922, and 924 may identify the second textual representations 920 and 922 as differing textual representations C1 and C2, respectively. The differing textual representations C1 and C2 may be organized into each possible set of differing textual representations such that a first set may include only C1 ([C1]), a second set may include only C2 ([C2]), and a third set may include C1 and C2 ([C1, C2]).

In these or other embodiments, an event "E1" may be identified as corresponding to the particular change 908, which includes the modifications that correspond to C1 and C2. Further, as an example, the event E1 may be identified as corresponding to the first set [C1] and the third set [C1, C2], but not the second set [C2]. As such, the first set [C1] and the third set [C1, C2] may be identified as matching sets. Additionally, because the first set [C1] includes a smaller number of differing textual representations than the third set [C1, C2], the first set [C1] may be determined to be and selected as the smallest-sized set.

Returning to FIG. 8. At block 812, a modified second AST may be obtained by removing one or more sub-trees of the second AST based on the identification of the smallest-sized set. In particular, as indicated above, the differing textual representations that are outside of the smallest-sized set may be those that may correspond to secondary modifications. As such, in some embodiments, the differing textual representations that are outside of the smallest sized set may be identified as secondary textual representations that correspond to secondary modifications. In these or other embodiments, the second sub-trees that correspond to the secondary textual representations may be identified as secondary sub-trees that may be removed from the second AST.

Figure 9E:
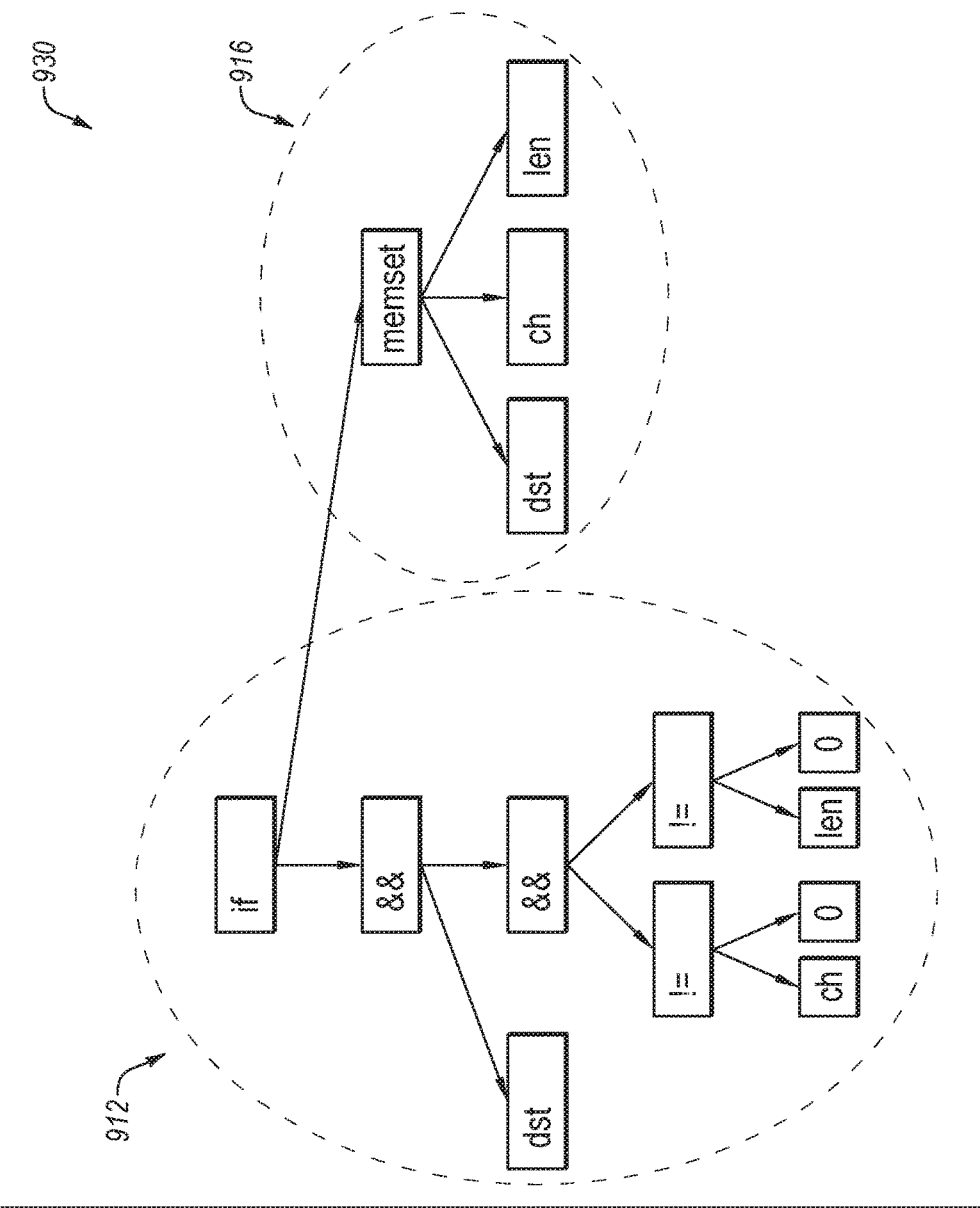
FIG. 9E illustrates ASTs including a modified AST.

By way of example, FIG. 9E illustrates a modified second AST 930 in which the second sub-tree 914 has been removed. As indicated above, the second sub-tree 914 corresponds to the differing textual representation C2, which is outside of the first set [C1] that was identified as the smallest-sized set. As such, the second sub-tree 914 may be removed. Of note, in the illustrated example, the second sub-tree 916 has not been removed because the second sub-tree 916 corresponds to a textual representation that is not a differing textual representation.

Returning to FIG. 8, in some embodiments, the method 800 may include additional operations to further trim the second AST. For example, in some embodiments, the method 800 may include performing the operations 806, 808, 810, and 812 with respect to another set of sub-trees that may be sub-trees with respect to the sub-trees previously analyzed. In some embodiments, the operations 806, 808, 810, and 812 may be repeated with respect to the additional sub-trees set until all the sub-trees have only one level (also referred to as a height of "1").

For instance, in some embodiments, the method 800 may include block 814 at which it may be determined whether any sub-trees of the first AST and the second AST have a height that is greater than "1". In response to there being at least one sub-tree having a height that is greater than "1", the method 800 may proceed from block 814 to block 816.

At block 816, the sub-trees with the biggest height may be partitioned into additional sub-trees. For example, in some embodiments, the height (i.e., the number of levels) of each sub-tree may be identified. Additionally or alternatively, a particular sub-tree of the ASTs may be identified as having a larger number of levels than the other sub-trees. In these or other embodiments, the particular sub-tree may be partitioned into additional sub-trees. Following block 816, the method 800 may proceed back to block 806.

Figure 9F:
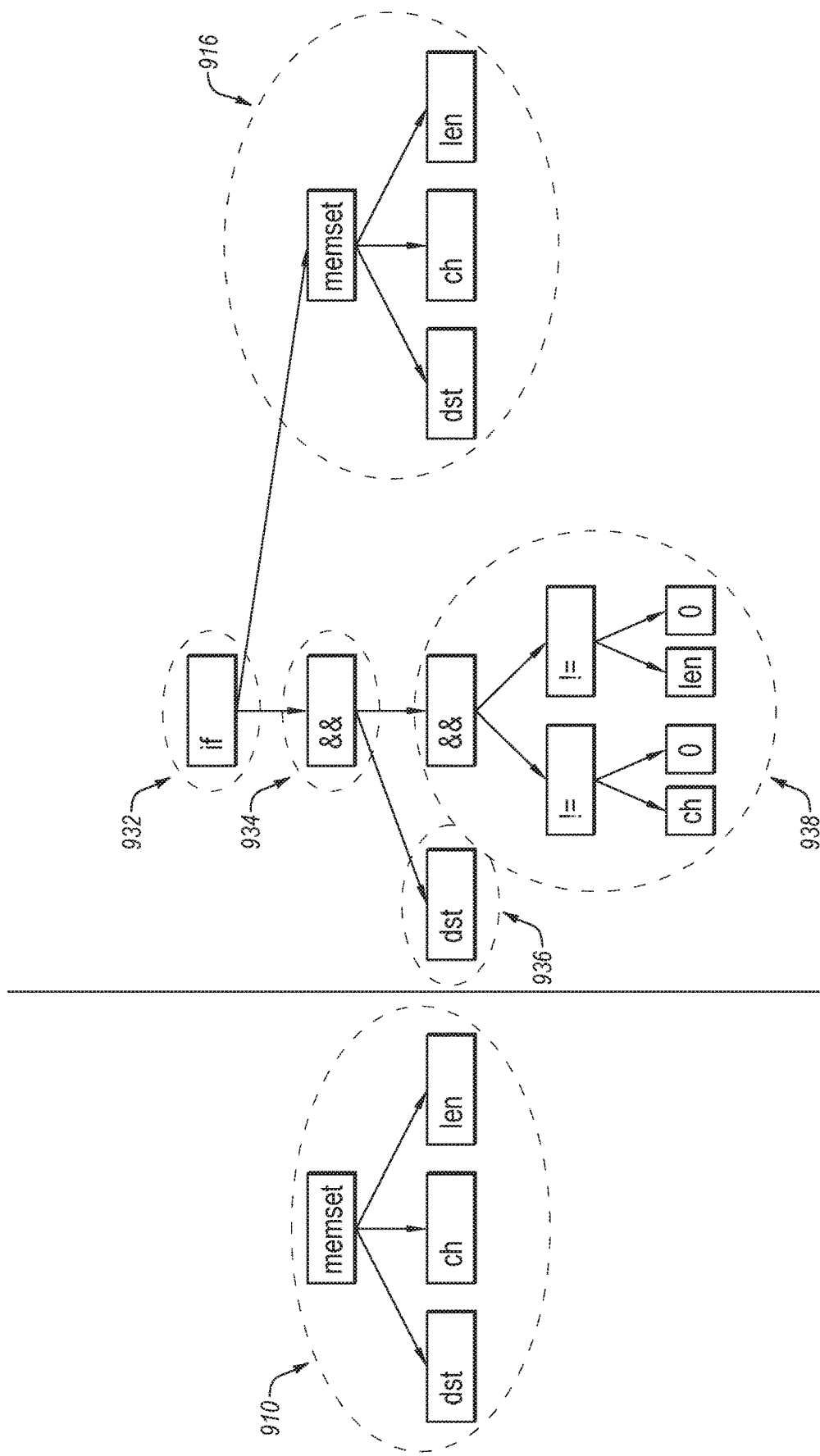
FIG. 9F illustrates example sub-trees of the ASTs of FIG. 9E.

By way of example, as illustrated in FIG. 9E, the first sub-tree 910 may have two levels (also referred to as a height of "2"), the second sub-tree 912 may have five levels (also referred to as a height of "5"), and the second sub-tree 916 may also have two levels (also referred to as a height of "2"). As such, given that the second sub-tree 912 has the most levels, the second sub-tree may be divided into additional sub-trees. For instance, as illustrated in FIG. 9F, the second sub-tree 912 of FIG. 9E may be divided into additional sub-trees 932, 934, 936, and 938. Following the division of the second sub-tree 912 into the additional sub-trees 932, 934, 936, a smallest-sized change set may be determined with respect to the corresponding textual representations of the additional sub-trees 932, 934, 936 such as described above. In some embodiments, the operations of blocks 806, 808, 810, 812, 814, and 816 may be repeated until all the sub-trees have only one level.

At block 818, a third iteration of the first source code may be obtained from the modified second AST. For example, the third iteration may be obtained by regenerating the first source code using the modified second AST. As indicated above, the modified second AST may include one or more portions removed as detailed above in which the one or more portions may correspond to secondary modifications that may have been made to the first source code. As such, the third iteration of the first source code may have one or more secondary modifications omitted therefrom. As such, analysis of the third iteration may be more efficient than analysis of the second iteration, which may include one or more secondary modifications that have been removed in the third iteration.

In some embodiments, one or more repair operations may be performed with respect to the first source code based on the third iteration of the first source code. For example, in some embodiments, the particular change may introduce an error in the first source code. Further, based on the third iteration of the first source code, a particular sub-portion of the particular portion may be identified as including a primary modification that introduces the error. In some embodiments, the particular sub-portion may be identified by comparing the first iteration against the third iteration to identify differences. In these or other embodiments, the particular sub-portion may be modified to repair the error. The particular sub-portion may be modified in response to determining that the particular sub-portion corresponds to a primary modification that introduced the error based on the third iteration. As such, the repair operations may be more directed and efficient than if they were performed based on the second iteration.

In these or other embodiments, the repair operations may include identifying one or more errors in the second source code based on executing a test suite with respect to the second source code. Additionally or alternatively, one or more repair candidates to repair the errors of the second source code may be identified or prioritized based on the third iteration of the first source code.

For example, in some embodiments, the third iteration may include a repair to a particular error and one or more code patterns may be identified from the third iteration in which the one or more code patterns indicate modifications that may be made to repair the particular error. In these or other embodiments, the identified code patterns may be used to select or prioritize repair candidates for errors of the second source code that are related to or the same as the particular error. The use of the third iteration to identify code patterns may be better than the second iteration by removing secondary modifications that may make it difficult to identify code helpful code patterns as opposed to unhelpful code patterns.

The method 800 may improve the efficiency and efficacy of software program testing and repair. For example, the use of a combination of ASTs and textual representations may allow for identifying secondary modifications in a more efficient manner than using just ASTs but also in a more effective manner than just using textual analysis. As such, the operations of method 800 may improve the efficacy and efficiency of computing systems configured to perform analysis and debugging operations with respect to software programs. Further, as detailed above, removal of secondary modifications may help to provide more efficient analysis and identification of problems and solutions by computing systems.

Modifications, additions, or omissions may be made to the method 800 without departing from the scope of the present disclosure. For example, the operations of method 800 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 or data storage 254 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
    determining a plurality of event correspondences in which each event correspondence indicates a correspondence between a respective change of a plurality of changes made to first source code of a first software program and a respective event type that occurs with respect to the first software program, the plurality of event correspondences being determined by performing two or more event type inference operations of a plurality of event type inference operations, the plurality of event type inference operations including:
        determining that a fault introduction event corresponds to a first change of the plurality of changes based on identifying a first software test of the first source code that passed without the first change included in the first source code and that failed with the first change included in the first source code;
        determining that a fault correction event corresponds to a second change of the plurality of changes based on identifying a second software test of the first source code that failed without the second change included in the first source code and that passed with the second change included in the first source code;
        determining that a defect introduction event corresponds to a third change of the plurality of changes based on a first defect not being identified from a first static analysis performed on the first source code without the third change being included in the first source code and based on the first defect being identified from a second static analysis performed on the first source code with the third change included in the first source code;
        determining that a defect correction event corresponds to a fourth change of the plurality of changes based on a second defect that is identified from a third static analysis performed on the first source code with the fourth change included in the first source code and based on the second defect not being identified from a fourth static analysis performed on the first source code with the fourth change included in the first source code; and
        determining that a platform migration event from a first version of a particular platform to a second version of the particular platform corresponds to a fifth change of the plurality of changes based on a first build of the first source code with the fifth change included therein having an error that is omitted with respect to a second build of the first source code with the fifth change included therein, the first build being performed using the first version of the particular platform and the second build being performed using the second version of the particular platform;

identifying one or more errors in second source code of a second software program based on executing a test suite with respect to the second source code; and performing repair operations on the second source code with respect to the one or more errors using the plurality of event correspondences determined from the first source code.

2. The method of claim 1, further comprising generating a commit message for a particular change of the plurality of changes in which the commit message indicates a respective event correspondence determined with respect to the particular change.

3. The method of claim 1, wherein determining that the fault introduction event corresponds to the first change includes:
   performing a first execution of a test suite with respect to a portion of the first source code that includes the first change, the test suite including the first software test;
   performing a second execution of the test suite with respect to the portion of the first source code without the first change included therein;
   identifying the first software test as a failing test with respect to the first execution;
   identifying the first software test as a passing test with respect to the second execution; and
   determining that the fault introduction event corresponds to the first change in response to: identifying the first software test as a failing test with respect to the first execution and identifying the first software test as a passing test with respect to the second execution.

4. The method of claim 1, wherein determining that the fault correction event corresponds to the second change includes:
   performing a first execution of a test suite with respect to a portion of the first source code that includes the second change, the test suite including the second software test;
   performing a second execution of the test suite with respect to the portion of the first source code without the second change included therein;
   identifying the second software test as a passing test with respect to the first execution;
   identifying the second software test as a failing test with respect to the second execution; and
   determining that the fault correction event corresponds to the second change in response to: identifying the second software test as a passing test with respect to the first execution and identifying the second software test as a failing test with respect to the second execution.

5. The method of claim 1, wherein determining that the defect introduction event corresponds to the third change includes:
   performing the second static analysis with respect to a portion of the first source code that includes the third change, the second static analysis identifying the first defect;
   performing the first static analysis with respect to the portion of the first source code without the third change included therein, the first static analysis not identifying the first defect; and
   determining that the defect introduction event corresponds to the third change in response to: the second static analysis identifying the first defect and the first static analysis not identifying the first defect.

6. The method of claim 1, wherein determining that the defect correction event corresponds to the fourth change includes:

performing the third static analysis with respect to a portion of the first source code that includes the fourth change, the third static analysis not identifying the second defect;
performing the fourth static analysis with respect to the portion of the first source code without the fourth change included therein, the fourth static analysis identifying the second defect; and
determining that the defect correction event corresponds to the fourth change in response to: the fourth static analysis identifying the second defect and the third static analysis not identifying the second defect.

7. The method of claim 1, wherein determining that the platform migration event corresponds to the fifth change includes:
   performing the first build with respect to a portion of the first source code that includes the fifth change, the first build identifying the error;
   performing the second build with respect to the portion of the first source code having the fifth change included therein, the second build not identifying the error; and
   determining that the platform migration event corresponds to the fifth change in response to: the first build identifying the error and the second build not identifying the error.

8. One or more non-transitory computer-readable storage media configured to store instructions that, in response to being executed, cause a system to perform operations, the operations comprising:
   determining a plurality of event correspondences in which each event correspondence indicates a correspondence between a respective change of a plurality of changes made to first source code of a first software program and a respective event type that occurs with respect to the first software program, the plurality of event correspondences being determined by performing two or more event type inference operations of a plurality of event type inference operations, the plurality of event type inference operations including:
      determining that a fault introduction event corresponds to a first change of the plurality of changes based on identifying a first software test of the first source code that passed without the first change included in the first source code and that failed with the first change included in the first source code;
      determining that a fault correction event corresponds to a second change of the plurality of changes based on identifying a second software test of the first source code that failed without the second change included in the first source code and that passed with the second change included in the first source code;
      determining that a defect introduction event corresponds to a third change of the plurality of changes based on a first defect not being identified from a first static analysis performed on the first source code without the third change being included in the first source code and based on the first defect being identified from a second static analysis performed on the first source code with the third change included in the first source code;
      determining that a defect correction event corresponds to a fourth change of the plurality of changes based on a second defect that is identified from a third static analysis performed on the first source code with the fourth change included in the first source code and based on the second defect not being identified from a fourth static analysis performed on the first source code with the fourth change included in the first source code; and determining that a platform migration event from a first version of a particular platform to a second version of the particular platform corresponds to a fifth change of the plurality of changes based on a first build of the first source code with the fifth change included therein having an error that is omitted with respect to a second build of the first source code with the fifth change included therein, the first build being performed using the first version of the particular platform and the second build being performed using the second version of the particular platform;

identifying one or more errors in second source code of a second software program based on executing a test suite with respect to the second source code; and performing repair operations on the second source code with respect to the one or more errors using the plurality of event correspondences determined from the first source code.

9. The one or more computer-readable storage media of claim 8, wherein the operations further comprise generating a commit message for a particular change of the plurality of changes in which the commit message indicates a respective event correspondence determined with respect to the particular change.

10. The one or more computer-readable storage media of claim 8, wherein determining that the fault introduction event corresponds to the first change includes:
performing a first execution of a test suite with respect to a portion of the first source code that includes the first change, the test suite including the first software test;
performing a second execution of the test suite with respect to the portion of the first source code without the first change included therein;
identifying the first software test as a failing test with respect to the first execution;
identifying the first software test as a passing test with respect to the second execution; and
determining that the fault introduction event corresponds to the first change in response to: identifying the first software test as a failing test with respect to the first execution and identifying the first software test as a passing test with respect to the second execution.

11. The one or more computer-readable storage media of claim 8, wherein determining that the fault correction event corresponds to the second change includes:
performing a first execution of a test suite with respect to a portion of the first source code that includes the second change, the test suite including the second software test;
performing a second execution of the test suite with respect to the portion of the first source code without the second change included therein;
identifying the second software test as a passing test with respect to the first execution;
identifying the second software test as a failing test with respect to the second execution; and
determining that the fault correction event corresponds to the second change in response to: identifying the second software test as a passing test with respect to the first execution and identifying the second software test as a failing test with respect to the second execution.

12. The one or more computer-readable storage media of claim 8, wherein determining that the defect introduction event corresponds to the third change includes:

performing the second static analysis with respect to a portion of the first source code that includes the third change, the second static analysis identifying the first defect;

performing the first static analysis with respect to the portion of the first source code without the third change included therein, the first static analysis not identifying the first defect; and determining that the defect introduction event corresponds to the third change in response to: the second static analysis identifying the first defect and the first static analysis not identifying the first defect.

13. The one or more computer-readable storage media of claim 8, wherein determining that the defect correction event corresponds to the fourth change includes:
performing the third static analysis with respect to a portion of the first source code that includes the fourth change, the third static analysis not identifying the second defect;
performing the fourth static analysis with respect to the portion of the first source code without the fourth change included therein, the fourth static analysis identifying the second defect; and
determining that the defect correction event corresponds to the fourth change in response to: the fourth static analysis identifying the second defect and the third static analysis not identifying the second defect.

14. The one or more computer-readable storage media of claim 8, wherein determining that the platform migration event corresponds to the fifth change includes:
performing the first build with respect to a portion of the first source code that includes the fifth change, the first build identifying the error;
performing the second build with respect to the portion of the first source code having the fifth change included therein, the second build not identifying the error; and
determining that the platform migration event corresponds to the fifth change in response to: the first build identifying the error and the second build not identifying the error.

15. A system comprising:
one or more computer-readable storage media configured to store instructions; and
one or more processors communicatively coupled to the one or more computer-readable storage media and configured to, in response to execution of the instructions, cause the system to perform operations, the operations comprising:
determining a plurality of event correspondences in which each event correspondence indicates a correspondence between a respective change of a plurality of changes made to first source code of a first software program and a respective event type that occurs with respect to the first software program, the plurality of event correspondences being determined by performing two or more event type inference operations of a plurality of event type inference operations, the plurality of event type inference operations including:
determining that a fault introduction event corresponds to a first change of the plurality of changes based on identifying a first software test of the first source code that passed without the first change included in the first source code and that failed with the first change included in the first source code;

determining that a fault correction event corresponds to a second change of the plurality of changes based on identifying a second software test of the first source code that failed without the second change included in the first source code and that passed with the second change included in the first source code;

determining that a defect introduction event corresponds to a third change of the plurality of changes based on a first defect not being identified from a first static analysis performed on the first source code without the third change being included in the first source code and based on the first defect being identified from a second static analysis performed on the first source code with the third change included in the first source code;

determining that a defect correction event corresponds to a fourth change of the plurality of changes based on a second defect that is identified from a third static analysis performed on the first source code with the fourth change included in the first source code and based on the second defect not being identified from a fourth static analysis performed on the first source code with the fourth change included in the first source code; and determining that a platform migration event from a first version of a particular platform to a second version of the particular platform corresponds to a fifth change of the plurality of changes based on a first build of the first source code with the fifth change included therein having an error that is omitted with respect to a second build of the first source code with the fifth change included therein, the first build being performed using the first version of the particular platform and the second build being performed using the second version of the particular platform; and generating a commit message for a particular change of the plurality of changes in which the commit message indicates a respective event correspondence determined with respect to the particular change.

16. The system of claim 15, wherein determining that the fault introduction event corresponds to the first change includes:

performing a first execution of a test suite with respect to a portion of the first source code that includes the first change, the test suite including the first software test;

performing a second execution of the test suite with respect to the portion of the first source code without the first change included therein;

identifying the first software test as a failing test with respect to the first execution;

identifying the first software test as a passing test with respect to the second execution; and determining that the fault introduction event corresponds to the first change in response to: identifying the first software test as a failing test with respect to the first execution and identifying the first software test as a passing test with respect to the second execution.

17. The system of claim 15, wherein determining that the fault correction event corresponds to the second change includes:

performing a first execution of a test suite with respect to a portion of the first source code that includes the second change, the test suite including the second software test;

performing a second execution of the test suite with respect to the portion of the first source code without the second change included therein;

identifying the second software test as a passing test with respect to the first execution;

identifying the second software test as a failing test with respect to the second execution; and determining that the fault correction event corresponds to the second change in response to: identifying the second software test as a passing test with respect to the first execution and identifying the second software test as a failing test with respect to the second execution.

18. The system of claim 15, wherein determining that the defect introduction event corresponds to the third change includes:

performing the second static analysis with respect to a portion of the first source code that includes the third change, the second static analysis identifying the first defect;

performing the first static analysis with respect to the portion of the first source code without the third change included therein, the first static analysis not identifying the first defect; and determining that the defect introduction event corresponds to the third change in response to: the second static analysis identifying the first defect and the first static analysis not identifying the first defect.

19. The system of claim 15, wherein determining that the defect correction event corresponds to the fourth change includes:

performing the third static analysis with respect to a portion of the first source code that includes the fourth change, the third static analysis not identifying the second defect;

performing the fourth static analysis with respect to the portion of the first source code without the fourth change included therein, the fourth static analysis identifying the second defect; and determining that the defect correction event corresponds to the fourth change in response to: the fourth static analysis identifying the second defect and the third static analysis not identifying the second defect.

20. The system of claim 15, wherein determining that the platform migration event corresponds to the fifth change includes:

performing the first build with respect to a portion of the first source code that includes the fifth change, the first build identifying the error;

performing the second build with respect to the portion of the first source code having the fifth change included therein, the second build not identifying the error; and determining that the platform migration event corresponds to the fifth change in response to: the first build identifying the error and the second build not identifying the error.

* * * * *